(12) United States Patent
Mitsubori et al.

(10) Patent No.: US 8,955,659 B2
(45) Date of Patent: Feb. 17, 2015

(54) INTERNAL COMBUSTION ENGINE AND SUPPLYING OIL PATH STRUCTURE FOR HYDRAULIC CLUTCH IN INTERNAL COMBUSTION ENGINE

(75) Inventors: Toshimasa Mitsubori, Wako (JP); Masazumi Naito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 326 days.

(21) Appl. No.: 13/397,717

(22) Filed: Feb. 16, 2012

(65) Prior Publication Data

US 2012/0247904 A1 Oct. 4, 2012

(30) Foreign Application Priority Data

Mar. 31, 2011 (JP) .................................. 2011-080682
Mar. 31, 2011 (JP) .................................. 2011-080683

(51) Int. Cl.
*F16D 25/0638* (2006.01)
*F16D 25/10* (2006.01)
*F01M 1/16* (2006.01)
*F16D 48/02* (2006.01)
*F16H 3/00* (2006.01)
*F16D 21/06* (2006.01)

(52) U.S. Cl.
CPC .................. *F01M 1/16* (2013.01); *F16H 3/006* (2013.01); *F16D 48/0206* (2013.01); *F16D 2021/0623* (2013.01); *F16D 2021/0661* (2013.01); *F16D 2300/18* (2013.01); *F16D 2300/26* (2013.01)
USPC ................. 192/48.614; 192/85.63; 192/30 W

(58) Field of Classification Search
USPC ...................................................... 192/48.614
See application file for complete search history.

(56) References Cited

U.S. PATENT DOCUMENTS

| | | | |
|---|---|---|---|
| 4,988,428 A * | 1/1991 | Iwakiri et al. ................. | 204/406 |
| 6,269,927 B1 * | 8/2001 | Kanenobu et al. ........ | 192/48.601 |
| 2009/0045026 A1 * | 2/2009 | Ishii et al. .................. | 192/87.14 |
| 2009/0084651 A1 * | 4/2009 | Fujimoto et al. ........... | 192/87.14 |
| 2009/0205734 A1 | 8/2009 | Nakatsuka et al. | |
| 2010/0072019 A1 * | 3/2010 | Ogasawara .............. | 192/48.611 |

FOREIGN PATENT DOCUMENTS

| JP | 11-351274 A | 12/1999 |
|---|---|---|
| JP | 2009-197662 A | 9/2009 |

* cited by examiner

*Primary Examiner* — Gene Crawford
*Assistant Examiner* — Ryan Dodd
(74) *Attorney, Agent, or Firm* — Birch, Stewart, Kolasch & Birch, LLP

(57) ABSTRACT

An internal combustion engine is provided with a plurality of hydraulic clutches, a plurality of hydraulic controlling valves for individually controlling the oil pressure for the hydraulic clutches, and a plurality of clutch oil pressure sensors for individually detecting the controlling oil pressure of controlling oil supplying paths interconnecting the hydraulic controlling valves and the hydraulic clutches. The oil pressure sensors individually correspond to the hydraulic clutches compactly, thereby to preventing an increase in size. The clutch oil pressure sensors are provided on an engine main body so as to be disposed in the proximity of and in parallel to each other while axial directions thereof are directed in a forward and backward direction of a saddle type vehicle in a state in which the engine main body is mounted on the saddle type vehicle.

19 Claims, 19 Drawing Sheets

INTERNAL COMBUSTION ENGINE AND SUPPLYING OIL PATH STRUCTURE FOR HYDRAULIC CLUTCH IN INTERNAL COMBUSTION ENGINE

CROSS-REFERENCE TO RELATED APPLICATION

The present application claims priority under 35 U.S.C. §119 to Japanese Patent Applications No. 2011-080682 and 2011-080683, both filed on Mar. 31, 2011, the entire contents of which are hereby incorporated by reference.

BACKGROUND OF THE INVENTION

1. Field of the Invention

This invention relates to an internal combustion engine which includes a plurality of hydraulic clutches, a plurality of hydraulic controlling valves for individually controlling the oil pressure for the hydraulic clutches, and a plurality of clutch oil pressure sensors for individually detecting the controlling oil pressure of controlling oil supplying paths interconnecting the hydraulic controlling valves and the hydraulic clutches. The hydraulic (oil pressure) controlling valves individually correspond to the hydraulic clutches and each has a valve housing and a valve body accommodated in the valve housing attached to a cover member. The cover member configures part of an engine main body and covers the hydraulic clutches, so as to control the oil pressure of the hydraulic clutches and a cover side supply oil path, which configures part of a plurality of controlling oil supply oil paths which individually connect the plural oil pressure controlling valves. Because the hydraulic clutches are provided in the cover member, the supply oil path structure of the hydraulic clutch is improved.

2. Description of Background Art

In the internal combustion engine disclosed in Japanese Patent Laid-Open No. 2009-197662, a single oil pressure sensor for detecting an oil pressure to be supplied to a single hydraulic clutch is attached to an engine main body. However, in an internal combustion engine which includes a plurality of hydraulic clutches, in order to control connection/disconnection of the hydraulic clutches, a plurality of oil pressure sensors individually corresponding to the hydraulic clutches are required, and if it is attempted to provide the oil pressure sensors along oil paths disposed in different directions from each other, then the space necessary for the disposition of the oil pressure sensors becomes great. Therefore, there is the possibility that increase in size of the internal combustion engine may be invited.

A supply oil path structure for a clutch with a pair of controlling oil supply oil paths for supplying controlling oil to a pair of hydraulic clutches provided in a crossing relationship with each other in a cover member which covers the hydraulic clutches is known from Japanese Patent Laid-Open No. Hei 11-351274.

However, in the supply oil path structure for a clutch disclosed in Japanese Patent Laid-Open No. Hei 11-351274, it is necessary to provide the controlling oil supply oil paths in pair in a spaced relationship from each other in the thicknesswise direction of the cover member on the cover member. Therefore, the cover member has an increased size, which gives rise to increase in size of the internal combustion engine.

SUMMARY AND OBJECTS OF THE INVENTION

The present invention has been made in view such a situation as described above, and it is an object of the present invention to provide an internal combustion engine wherein a plurality of oil pressure sensors individually corresponding to different hydraulic clutches are disposed compactly thereby to prevent increase in size.

It is another object of the present invention to provide a supply oil path structure for a hydraulic clutch in an internal combustion engine which can avoid increase in size of a cover member in which a plurality of controlling oil supply oil paths individually communicating with a plurality of hydraulic clutches are disposed in a crossing relationship with each other.

According to an embodiment of the present invention, an internal combustion engine includes a plurality of hydraulic clutches, a plurality of oil pressure controlling valves for individually controlling an oil pressure for the hydraulic clutches, and a plurality of clutch oil pressure sensors for individually detecting a controlling oil pressure in controlling oil supply paths interconnecting the oil pressure controlling valves and the hydraulic clutches. The plural clutch oil pressure sensors are provided on an engine main body so as to be disposed in the proximity of and in parallel to each other while axial directions thereof are directed in a forward and backward direction of a saddle type vehicle in a state in which the engine main body is mounted on the saddle type vehicle.

Further, according to an embodiment of the present invention, an oil filter is interposed between oil pressure generation means and the oil pressure controlling valves and has a cylindrical filter case is disposed on the engine main body such that an axial line of the filter case is disposed in a direction crossing with the axial lines of the plural clutch oil pressure sensors and the oil filter is displaced forwardly or backwardly with respect to the plural clutch oil pressure sensors in the state in which the engine main body is mounted on the saddle type vehicle.

According to an embodiment of the present invention, a pair of the clutch oil pressure sensors individually correspond to a pair of the hydraulic clutches and an oil filter oil pressure sensor for detecting the supplying oil pressure to the oil filter are disposed in parallel to each other.

According to an embodiment of the present invention, an outer end of the filter case is disposed outwardly with respect to an outer end of the oil filter oil pressure sensor along the axial direction of the filter case.

According to an embodiment of the present invention, a projection which projects outwardly sidewardly with respect to the oil pressure sensor positioned lowest from among the clutch oil pressure sensors in pair and the oil filter oil pressure sensor is provided in a projecting manner so as to be positioned in the proximity of the oil pressure sensor positioned lowest.

According to an embodiment of the present invention, a level gage insertion tube which is provided on the engine main body and swollen sidewardly from the engine main body is disposed rearwardly with respect to the oil filter in the state in which the engine main body is mounted on the saddle type vehicle.

According to an embodiment of the present invention, the pair of clutch oil pressure sensors and the oil filter oil pressure sensor are disposed at a front side lower portion of a side face of the engine main body, and a front face lower portion of the engine main body is formed in a curved state such that it is positioned rearwardly toward the lower side. In addition, an attaching boss for attaching the oil pressure sensor positioned lowest from among the clutch oil pressure sensors and the oil filter oil pressure sensor to the engine main body is disposed at a position displaced rearwardly with respect to attaching bosses for attaching the remaining hydraulic sensors to the engine main body.

According to an embodiment of the present invention, the oil pressure sensors are provided on a side face of the engine main body on one end side in the axial line direction of a crankshaft in such a manner as to be disposed forwardly with respect to the crankshaft and downwardly with respect to the clutches for changing over connection/disconnection of power transmission between the crankshaft and main shafts which can rotate in an interlocking relationship with the crankshaft.

According to an embodiment of the present invention, a lubricating oil pressure sensor for detecting the supply oil pressure of lubricating oil to be supplied to a plurality of lubrication object portions at a plurality of places of the engine main body is attached to the engine main body forwardly with respect to the clutch oil pressure sensors and the oil filter oil pressure sensor.

It is to be noted that first and second main shafts 60 and 61 of an embodiment correspond to the main shafts in the present invention; first and second hydraulic clutches 71 and 72 of the embodiment correspond to the clutches in the present invention; a second oil pump 116 corresponds to the oil pressure generation means in the present invention; and a second oil filter 178 in the embodiment corresponds to the oil filter in the present invention.

According to an embodiment of the present invention, a supply oil path structure for a hydraulic clutch in the internal combustion engine includes a plurality of oil pressure controlling valves individually corresponding to a plurality of hydraulic clutches and each having a valve housing and a valve body accommodated in the valve housing are attached to a cover member. The cover member configures part of an engine main body and covers the hydraulic clutches, so as to control the oil pressure of the hydraulic clutches and cover side supply oil paths. The cover side supply oil paths configure part of a plurality of controlling oil supply oil paths and individually connect the plural oil pressure controlling valves. The hydraulic clutches are provided in the cover member, and a partition member is interposed between the cover member and the valve housings of the plural oil pressure controlling valves. The controlling valve side supply oil paths are individually communicated with the cover side supply oil paths in such a manner as to configure the controlling oil supply oil paths together with the plural cover side supply oil paths and cross with each other and are formed on the opposite face sides of the partition member.

According to an embodiment of the present invention, a support holder for holding the plural oil pressure controlling valves is attached to the cover member in cooperation with the cover member to sandwich the partition member therebetween, and grooves which cooperate with the opposite faces of the partition member to configure the controlling valve side supply oil paths are provided on a face of the support holder which faces the partition member side and a face of the cover member which faces the partition member.

According to an embodiment of the present invention, the plural oil pressure controlling valves for which actuators for driving the valve bodies are provided are disposed below a primary driving gear wheel disposed at a shaft end of a crankshaft as viewed in a side elevation in a direction along an axial line of the crankshaft, and the controlling valve side supply oil paths are disposed in a crossing relationship with each other between the actuators and the primary driving gear wheel as viewed in the side elevation.

According to an embodiment of the present invention, the controlling valve side supply oil paths are disposed in a crossing relationship with each other on the outer side of a projection range of the oil pressure controlling valves in an axial line direction of the crankshaft.

According to an embodiment of the present invention, the clutch oil pressure sensors are disposed individually at an end portion of the plural controlling valve side supply oil paths on the opposite side to the cover side supply oil paths.

According to an embodiment of the present invention, a semicircular arcuate portion disposed along a periphery of a bolt, which fastens the support holder, which cooperates with the cover member to sandwich the partition member therebetween, to the cover member, in such a manner as to bypass the bolt is formed at part of at least one of the plural controlling valve side supply oil paths.

According to an embodiment of the present invention, a level gage insertion tube extending upwardly from a lower portion of the cover member is disposed on the outer side of the cover member in a corresponding relationship to the portion at which the controlling valve side supply oil paths cross with each other.

According to an embodiment of the present invention, an accommodating portion for accommodating actuators for driving the valve bodies is provided in the support holder, and a cable extracting hole for extracting cables connected to the actuators therethrough is provided at an upper portion of the accommodating portion rearwardly of the controlling valve side supply oil paths.

It is to be noted that a clutch cover 58 corresponds to the cover member in the present invention; spool valve bodies 197 and 198 in the embodiment correspond to the valve bodies in the present invention; and solenoids 133 and 134 in the embodiment correspond to the actuators in the present invention.

Effects of the invention include the following:

According to an embodiment of the present invention, since the plural clutch oil pressure sensors are disposed in the proximity of and in parallel to each other while the axial directions thereof are directed in the forward and backward direction, the plural clutch oil pressure sensors can be disposed efficiently and compactly with the directions thereof lined up with each other, and increase in size of the internal combustion engine can be avoided.

According to an embodiment of the present invention, the oil filter having the cylindrical filter case is disposed such that the axial line of the filter case is directed in the direction crossing with the longitudinal directions of the clutch oil pressure sensors and the oil filter is displaced forwardly or backwardly with respect to the clutch oil pressure sensors. Therefore, the oil filter and the clutch oil pressure sensors can be disposed in a forwardly or backwardly displaced relationship such that they do not overlap with each other in the leftward and rightward direction of the engine main body. Consequently, increase in size of the internal combustion engine in the leftward and rightward direction can be suppressed.

According to an embodiment of the present invention, since the clutch oil pressure sensors in pair and the oil filter oil pressure sensor are disposed in parallel to each other, the oil filter oil pressure sensor can be disposed efficiently and compactly in addition to the clutch oil pressure sensors.

According to an embodiment of the present invention, since the outer end of the filter case is disposed outwardly with respect to the outer end of the oil filter oil pressure sensor, when the saddle type vehicle falls down, the oil filter oil pressure sensor can be protected by the outer end of the filter case.

According to an embodiment of the present invention, since the projection which projects outwardly sidewardly with respect to the oil pressure sensor positioned lowest from among the clutch oil pressure sensors in pair and the oil filter oil pressure sensor is provided in a projecting manner, when the saddle type vehicle falls down, the oil pressure sensor positioned lowermost can be protected by the projection.

According to an embodiment of the present invention, since the level gage insertion tube which is swollen sidewardly from the engine main body is disposed rearwardly with respect to the oil filter, it is possible to prevent increase in size of the internal combustion engine in the leftward and rightward direction by disposing the level gage insertion tube making use of the dead space around the oil filter.

According to an embodiment of the present invention, the front face lower portion of the engine main body is formed in the curved state such that it is positioned rearwardly toward the lower side, and the attaching boss for attaching the oil pressure sensor positioned lowest from among the clutch oil pressure sensors and the oil filter oil pressure sensor which are disposed at the front side lower portion of the engine main body is disposed at the position displaced rearwardly with respect to the attaching bosses for attaching the remaining hydraulic sensors. Therefore, it is possible to prevent the oil pressure sensor from projecting forwardly from the lower portion of the engine main body.

According to an embodiment of the present invention, the plural oil pressure sensors are disposed forwardly with respect to the crankshaft and downwardly with respect to the clutches for changing over connection/disconnection of power transmission between the crankshaft and the main shafts. Therefore, where a plurality of oil pressure sensors are disposed on a side face of the engine main body on the one end side in the axial direction of the crankshaft, the plural oil pressure sensors can be disposed in a free space avoiding the clutches which exhibit the greatest width among parts which configure the internal combustion engine and the crankshaft which has an influence on the widthwise dimension of the engine main body. Consequently, increase in size of the internal combustion engine can be suppressed.

According to an embodiment of the present invention, the lubricating oil pressure sensor for detecting the supply oil pressure of lubricating oil is attached to the engine main body forwardly with respect to the clutch oil pressure sensors and the oil filter oil pressure sensor. Therefore, the clutch oil pressure sensors and oil filter oil pressure sensor and the lubricating oil pressure sensor can be disposed efficiently while avoiding interference between them.

According to an embodiment of the present invention, the controlling valve side supply oil paths which configure the controlling oil supply oil paths together with the plural cover side supply oil paths and cross with each other are formed on the opposite face sides of the partition member interposed between the cover member and the valve housings of the plural oil pressure controlling valves. Therefore, it is possible to cross the controlling valve side supply oil paths with each other by causing the controlling valve side supply oil paths to extend between the one face side and the other face side of the partition member. Since the partition member may be a very thin one, the plural controlling valve side supply oil paths can be crossed with each other without making the cover member thick, and increase in side of the internal combustion engine can be prevented.

According to an embodiment of the present invention, the partition member is sandwiched between the support holder for holding the plural oil pressure controlling valves and the cover member, and the grooves which are provided on the faces of the support holder and the cover member which face the partition member side and the opposite faces of the partition member cooperate with each other to configure the controlling valve side supply oil paths. Therefore, even if the route of the controlling valve side supply oil paths is complicated, only grooving is required, and consequently, the controlling valve side supply oil paths can be formed simply.

According to an embodiment of the present invention, the oil pressure controlling valves for which the actuators are provided are disposed below the primary driving gear wheel as viewed in the side elevation in the direction along the axial line of the crankshaft, and the controlling valve side supply oil paths are disposed in a crossing relationship with each other between the actuators and the primary driving gear wheel. Therefore, even if the space between the actuators and the primary driving gear wheels is narrowed, the controlling valve side supply oil paths can be formed so as to extend through the narrow space by crossing them with each other.

According to an embodiment of the present invention, the controlling valve side supply oil paths are disposed in a crossing relationship with each other on the outer side of the projection range of the oil pressure controlling valves in the axial line direction of the crankshaft. Therefore, although the crossing of the oil pressure controlling valves with each other increases the disposition space of the controlling valve side supply oil paths required in the crossing direction, increase of the engine width at the portion at which the oil pressure controlling valves are disposed can be suppressed.

According to an embodiment of the present invention, since the oil pressures are detected by the clutch oil pressure sensors at the end portion of the controlling valve side supply oil paths on the opposite side to the cover side supply oil paths, the controlling oil pressures of the plural hydraulic clutches can be detected independently of each other.

According to an embodiment of the present invention, part of at least one of the plural controlling valve side supply oil paths is disposed along the periphery of the bolt, which fastens the support holder to the cover member, in such a manner as to bypass the bolt. Therefore, the attaching strength at the fastening portion by the bolt can be increased, and oil leakage from the proximity of the bolt can be suppressed.

According to an embodiment of the present invention, the level gage insertion tube is disposed on the outer side of the cover member in a corresponding relationship to the portion at which the controlling valve side supply oil paths cross with each other. Therefore, the level gage insertion tube is disposed at the portion at which the engine width has a room in comparison with the portion at which the oil pressure controlling valves are disposed, and increase in size of the internal combustion engine E can be suppressed.

Further, according to an embodiment of the present invention, the cable extracting hole is provided at the upper portion of the accommodating portion provided in the support holder in such a manner as to accommodate the actuators therein such that it is positioned rearwardly with respect to the controlling valve side supply oil paths. Therefore, the cables can be extracted such that the controlling valve side supply oil path sides may not make an obstacle, and improvement in assembly property and maintenance property can be anticipated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
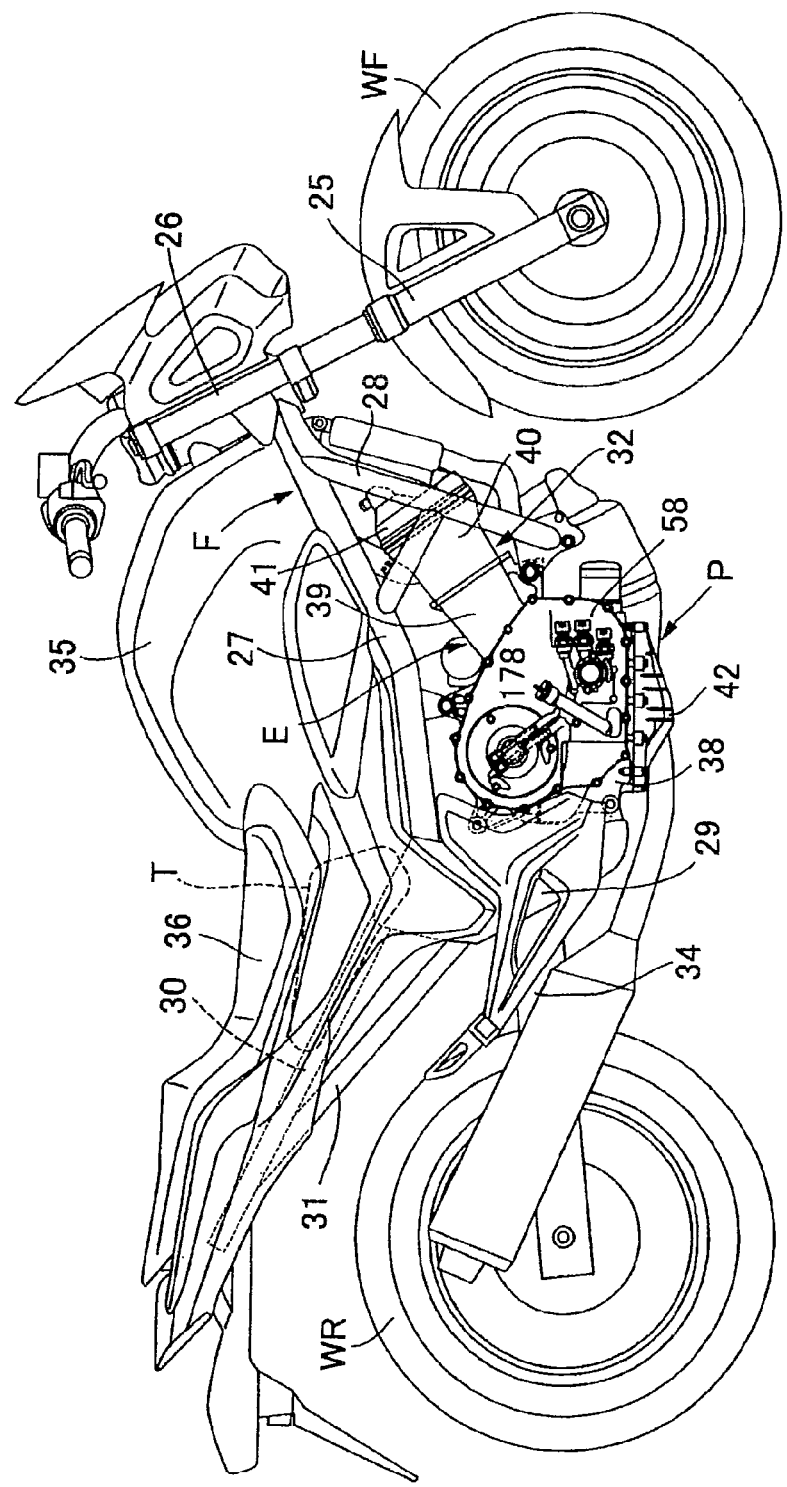
FIG. 1 is a side elevational view of a motorcycle.

An embodiment of the present invention is described with reference to FIGS. 1 to 20 of the accompanying drawings. Referring first to FIG. 1, a vehicle body frame F of a motorcycle which is a saddle type vehicle includes a head pipe 26 for supporting a front fork 25, on which a front wheel WF is supported for rotation, for steering movement, a pair of left and right main frames 27, . . . extending rearwardly downwards from the head pipe 26, a pair of left and right down frames 28 . . . extending rearwardly downwards more steeply than the main frames 27, . . . , a pair of left and right center frames 29, . . . extending downwardly from a rear end of the main frames 27, . . . , a pair of left and right seat rails 30, . . . extending rearwardly upwards from an upper portion of the center frames 29, . . . , and rear frames 31, . . . interconnecting intermediate portions of the center frames 29, . . . and rear portions of the seat rails 30, . . . .

In a region defined by the main frames 27, . . . , down frames 28, . . . and center frames 29, . . . , a power unit P including an internal combustion engine E of a multi-cylinder type, for example, a two-cylinder type and a speed change gear M (refer to FIG. 3) partly built in an engine main body 32 of the internal combustion engine E is disposed in such a manner that it is supported by the vehicle body frame F. A swing arm 34 is supported at a front end portion thereof for upward and downward rocking motion on the center frames 29, . . . and supports, at a rear end portion thereof, a rear wheel WR, which is driven by power provided by the power unit P, for upward and downward rocking motion. An accommodation box 35 is carried on the main frames 27, . . . above the internal combustion engine E, and a seat 36 of the tandem type is disposed rearwardly of the accommodation box 35 such that it is supported by the seat rails 30, . . . . . A fuel tank T is disposed below the seat 36.

Figure 2:
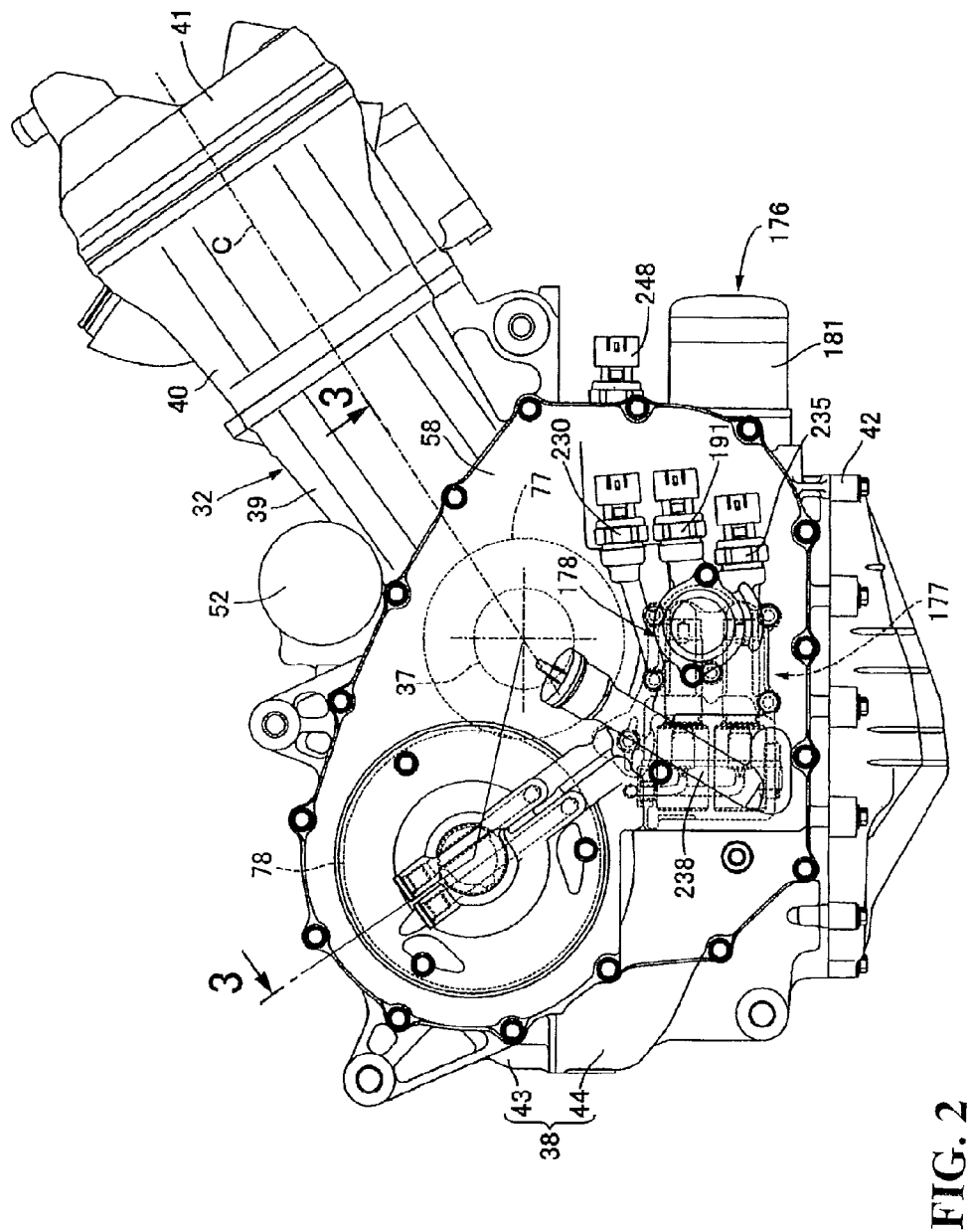
FIG. 2 is a side elevational view of an engine main body as viewed in the same direction as that in FIG. 1.

Referring to FIG. 2, the engine main body 32 of the internal combustion engine E includes a crankcase 38 for supporting a crankshaft 37, which has an axial line extending in a vehicle widthwise direction, for rotation thereon, a cylinder block 39 coupled to an upper end of a front portion of the crankcase 38 so as to have a forwardly inclined cylinder axial line C, a cylinder head 40 coupled to an upper end of the cylinder block 39, a head cover 41 coupled to an upper end of the cylinder head 40, and an oil pan 42 coupled to a lower portion of the crankcase 38.

Figure 3:
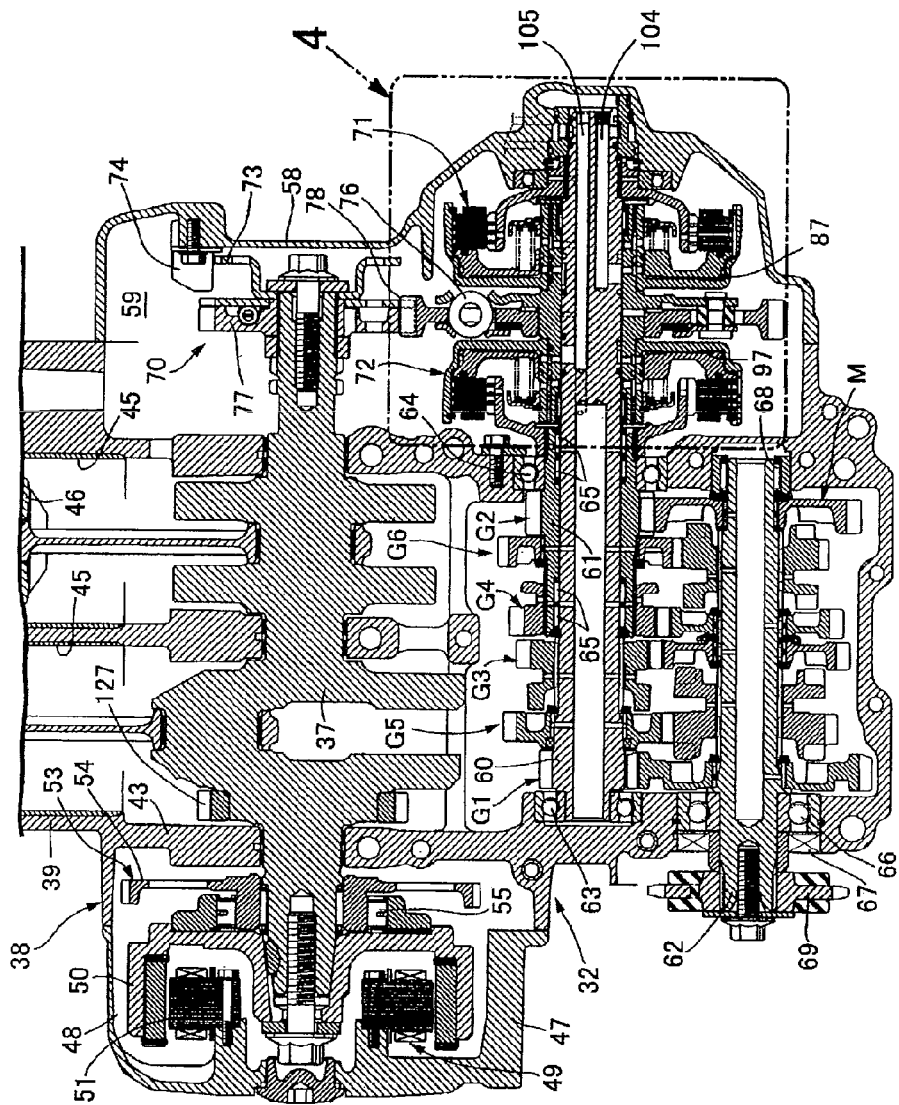
FIG. 3 is a sectional view taken along line 3-3 of FIG. 2.

Referring also to FIG. 3, the crankcase 38 is formed from an upper case half 43 and a lower case half 44 coupled to each other such that they can be divided upwardly and downwardly along a parting plane which extends along a horizontal plane which passes an axial line of the crankshaft 37. The cylinder block 39 is formed integrally with the upper case half 43.

The cylinder block 39 has a plurality of, for example, two, cylinder bores 45, 45 disposed in parallel to each other in the vehicle widthwise direction. Pistons 46, . . . are fitted for sliding movement in the cylinder bores 45, . . . . The pistons 46, . . . are connected to the crankshaft 37 which extends along an array direction of the cylinder bores 45, . . . , that is, in the vehicle widthwise direction and is supported for rotation by the crankcase 38.

A generator cover 47 which configures part of the engine main body 32 is coupled to the left side face of the crankcase 38 and cooperates with the crankcase 38 to form a generator chamber 48 therebetween. A generator 49 is accommodated in the generator chamber 48, and a rotor 50 of the generator 49 is secured to an end portion of the crankshaft 37 which extends into the generator chamber 48. A stator 51 of the generator 49 is secured to the generator cover 47 in such a manner as to be surrounded by the rotor 50.

A starter motor 52 is disposed fixedly to an upper portion of the crankcase 38 as shown in FIG. 2. A driven gear wheel 54 is connected to the rotor 50 through a one-way clutch 55 and configures part of a speed reduction gear train 53 for transmitting power from the starter motor 52.

A clutch cover 58 which cooperates with the crankcase 38 to form a clutch chamber 59 is coupled to the right side face of the crankcase 38 such that it configures part of the engine main body 32. The speed change gear M is accommodated in the crankcase 38. The speed change gear M includes first and second main shafts 60 and 61 supported for rotation on the crankcase 38 and having axial lines parallel to the crankshaft 37, and a plurality of gear trains, for example, first to sixth speed gear trains G1 to G6, of different shift stages which can be selectively established through cooperation with a countershaft 62.

The first and second main shafts 60 and 61 are disposed coaxially, and the first main shaft 60 extends for rotation through the right side wall of the crankcase 38 and is supported at one end portion thereof for rotation on the left side wall of the crankcase 38 through a ball bearing 63. The first main shaft 60 is supported at the other end portion thereof for rotation on the clutch cover 58. Meanwhile, the second main shaft 61 coaxially surrounds the first main shaft 60 and extends for rotation through the right side wall of the crankcase 38. A ball bearing 64 is interposed between the right side wall of the crankcase 38 and the second main shaft 61, and a plurality of needle bearings 65, 65, . . . are interposed between the first and second main shafts 60 and 61.

One end portion of the countershaft 62 projects from a rear portion of the left side wall of the crankcase 38 with a ball bearing 66 and an annular seal member 67 interposed between the same and the left side wall of the crankcase 38. The countershaft 62 is supported at the other end portion thereof for rotation on the right side wall of the crankcase 38 through a needle bearing 68.

The first speed gear train G1, third speed gear train G3 and fifth speed gear train G5 are provided between the first main shaft 60 and the countershaft 62, and the second speed gear train G2, fourth speed gear train G4 and sixth speed gear train G6 are provided between the second main shaft 61 and the countershaft 62.

A drive sprocket 69 is secured to the one end portion of the countershaft 62 which projects from the left side wall of the crankcase 38. Rotating power outputted from the speed change gear M is transmitted to the rear wheel WR by an endless chain (not shown) which is wrapped around the drive sprocket 69.

In the clutch chamber 59, a primary reduction gear 70 which transmits power from the crankshaft 37, a first hydraulic clutch 71 interposed between the primary reduction gear 70 and the first main shaft 60, and a second hydraulic clutch 72 interposed between the primary reduction gear 70 and the second main shaft 61 are accommodated.

A pulser 73 is securely mounted at an end portion of the crankshaft 37 in the clutch chamber 59. A rotational speed sensor 74 is secured to the clutch cover 58 and disposed in the clutch chamber 59 in such a manner as to oppose to an outer periphery of the pulser 73.

Figure 4:
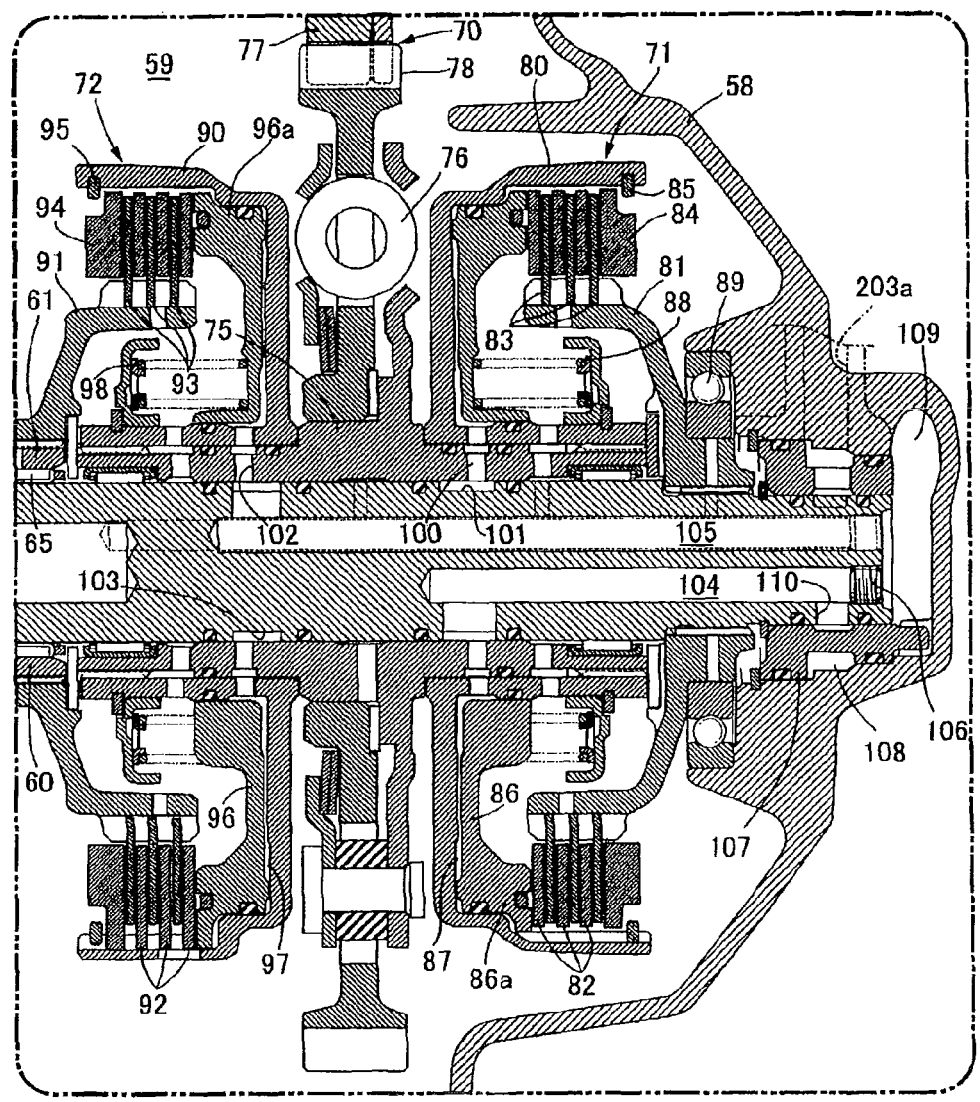
FIG. 4 is an enlarged view of a portion indicated by an arrow mark 4 of FIG. 3.

Referring to FIG. 4, a transmission cylinder shaft 75 is mounted for relative rotation at an intermediate portion rather near to the other end of the first main shaft 60 such that it is positioned adjacent the second main shaft 61 in the axial direction with the position thereof in the axial direction fixed. The first hydraulic clutch 71 is provided on the first main shaft 60 such that it can carry out changeover between connection and disconnection of power between the transmission cylinder shaft 75 and the first main shaft 60. The second hydraulic clutch 72 is provided on the transmission cylinder shaft 75 and the second main shaft 61 such that it can carry out changeover between connection and disconnection of power between the transmission cylinder shaft 75 and the second main shaft 61.

To the transmission cylinder shaft 75, power from the crankshaft 37 is transmitted through the primary reduction gear 70 and a damper spring 76. The primary reduction gear 70 includes a primary driving gear wheel 77 which rotates together with the crankshaft 37, and a primary driven gear wheel 78 disposed coaxially with the first and second main shafts 60 and 61 for meshing with the primary driving gear wheel 77. The primary driven gear wheel 78 is connected to the transmission cylinder shaft 75 through the damper spring 76.

The first hydraulic clutch 71 is disposed on the right side with respect to the primary reduction gear 70 and includes a first clutch outer 80 formed in a bowl shape open to the opposite side to the primary reduction gear 70 and coupled against relative rotation to the transmission cylinder shaft 75, and a first clutch inner 81 coupled against relative rotation to the first main shaft 60. The first hydraulic clutch 71 further includes a plurality of first driving friction plates 82, 82, . . . engaged for relative rotation in the axial direction with the first clutch outer 80, and a plurality of driven friction plates 83, 83, . . . disposed alternately with the first driving friction plates 82, 82, . . . and engaged with the first clutch inner 81 for relative movement in the axial direction. The first hydraulic clutch 71 further includes a ring-shaped first pressure receiving plate 84 opposing to that one of the plural first driving friction plates 82, 82, . . . and first driven friction plates 83, 83, . . . disposed alternately which is positioned most outwardly, and a first snap ring 85 mounted on the first clutch outer 80 for engaging with the pressure receiving plate 84 from the opposite side to the first driving friction plates 82, 82, . . . and the first driven friction plates 83, 83, . . . . The first hydraulic clutch 71 further includes a first piston 86 having, on an outer peripheral portion thereof, a pressing portion 86a for cooperating with the pressure receiving plate 84 to sandwich the first driving friction plates 82, 82, . . . and the first driven friction plates 83, 83, . . . therebetween, fitted liquidtight for sliding movement on the first clutch outer 80 and cooperating with the first clutch outer 80 to form a first pressure oil chamber 87 therebetween. The first hydraulic clutch 71 further includes a first clutch spring 88 for biasing the first piston 86 in a direction in which the volume of the first pressure oil chamber 87 is reduced. A ball bearing 89 is interposed between the first clutch inner 81 and the clutch cover 58. In other words, the first main shaft 60 is supported at the other end portion thereof for rotation on the clutch cover 58 through the first clutch inner 81.

Such a first hydraulic clutch 71 as described above is, in a state in which no liquid pressure acts upon the first pressure oil chamber 87, in a clutch off state in which power transmission is cut off. When an oil pressure acts upon the first pressure oil chamber 87, the first hydraulic clutch 71 is placed in a clutch on state in which rotating power transmitted from the primary driven gear wheel 78 to the first clutch outer 80 through the primary reduction gear 70, damper spring 76 and transmission cylinder shaft 75 is transmitted to the first main shaft 60.

The second hydraulic clutch 72 is disposed on the crankcase 38 side with respect to the first hydraulic clutch 71 in such a manner as to cooperate with the first hydraulic clutch 71 to sandwich the primary reduction gear 70 therebetween. The second hydraulic clutch 72 includes a second clutch outer 90 formed in a shape of a tube open toward the crankcase 38 side and coupled against rotation on the transmission cylinder shaft 75, and a second clutch inner 91 coupled against relative rotation on the second main shaft 61. The second hydraulic clutch 72 further includes a plurality of second driving friction plates 92, 92, . . . engaged for relative movement in the axis direction to the second clutch outer 90, and a plurality of driven friction plates 93, 93, . . . disposed alternately with the second driving friction plates 92, 92, . . . and engaged with the second clutch inner 91 for relative movement in the axial direction. The second hydraulic clutch 72 further includes a ring-shaped second pressure receiving plate 94 opposing to that one of the plural second driving friction plates 92, 92, . . . and the plural second driven friction plates 93, 93, . . . disposed alternatively which is positioned most outwardly, and a second snap ring 95 mounted on the second clutch outer 90 for engaging with the second pressure receiving plate 94 from the opposite side to the second driving friction plates 92, 92, . . . and the second driven friction plates 93, 93, . . . . The second hydraulic clutch 72 further includes a second piston 96 having, on an outer peripheral portion thereof, a pressing portion 96a cooperating with the second pressure receiving plate 94 to sandwich the second driving friction plates 92, 92, . . . and the second driven friction plates 93, 93, . . . therebetween, fitted liquidtight for sliding movement with the second clutch outer 90 and cooperating with the second clutch outer 90 to form a second pressure oil chamber 97 therebetween. The second hydraulic clutch 72 further includes a second clutch spring 98 for biasing the second piston 96 in a direction in which the volume of the second pressure oil chamber 97 is reduced.

Such a second hydraulic clutch 72 as described above is, in a state in which no liquid pressure acts upon the second pressure oil chamber 97, in a clutch off state in which power transmission is cut off. When an oil pressure acts upon the second pressure oil chamber 97, the second hydraulic clutch 72 is placed in a clutch on state in which rotating power transmitted from the crankshaft 37 to the second clutch outer 90 through the primary reduction gear 70, damper spring 76 and transmission cylinder shaft 75 is transmitted to the second main shaft 61.

A first oil path 100 communicating with the first pressure oil chamber 87 is provided in the first clutch outer 80 and the transmission cylinder shaft 75 of the first hydraulic clutch 71, and a first annular recessed portion 101 communicating with the first oil path 100 is provided on an outer periphery of the first main shaft 60. Meanwhile, a second oil path 102 communicating with the second pressure oil chamber 97 is provided in the second clutch outer 90 and the transmission cylinder shaft 75 of the second hydraulic clutch 72, and a second annular recessed portion 103 communicating with the second oil path 102 is provided on an outer periphery of the first main shaft 60.

First and second axial oil paths 104 and 105 parallel to each other are provided at the other end portion of the first main shaft 60 such that they are closed at an inner end thereof and extend in the axial direction. The first axial oil path 104 is communicated with the first pressure oil chamber 87 through the first annular recessed portion 101 and the first oil path 100, and the second axial oil path 105 is communicated with the second pressure oil chamber 97 through the second annular recessed portion 103 and the second oil path 102. Besides, the outer end opening of the first axial oil path 104 is closed with a plug member 106 while the outer end of the second axial oil path 105 remains open.

Further, the second main shaft 61 is fitted at the other end portion thereof liquidtight in a tube member 107 which is fitted with and secured to the clutch cover 58, and a communicating path 110 is provided in the tube member 107 such that it communicates the first axial oil path 104 with an annular first oil chamber 108 which is formed between an outer periphery of the tube member 107 and the clutch cover 58. A second oil chamber 109 communicating with the second axial oil path 105 is formed between the first main shaft 60 and tube member 107 and the clutch cover 58.

Incidentally, around a lower portion rather near to a front portion of the engine main body 32, an oil pump unit 112 is disposed as indicated by a broken line in FIG. 2, and an oil strainer 113 for filtering oil in the oil pan 42 is connected to the oil pump unit 112.

Figure 5:
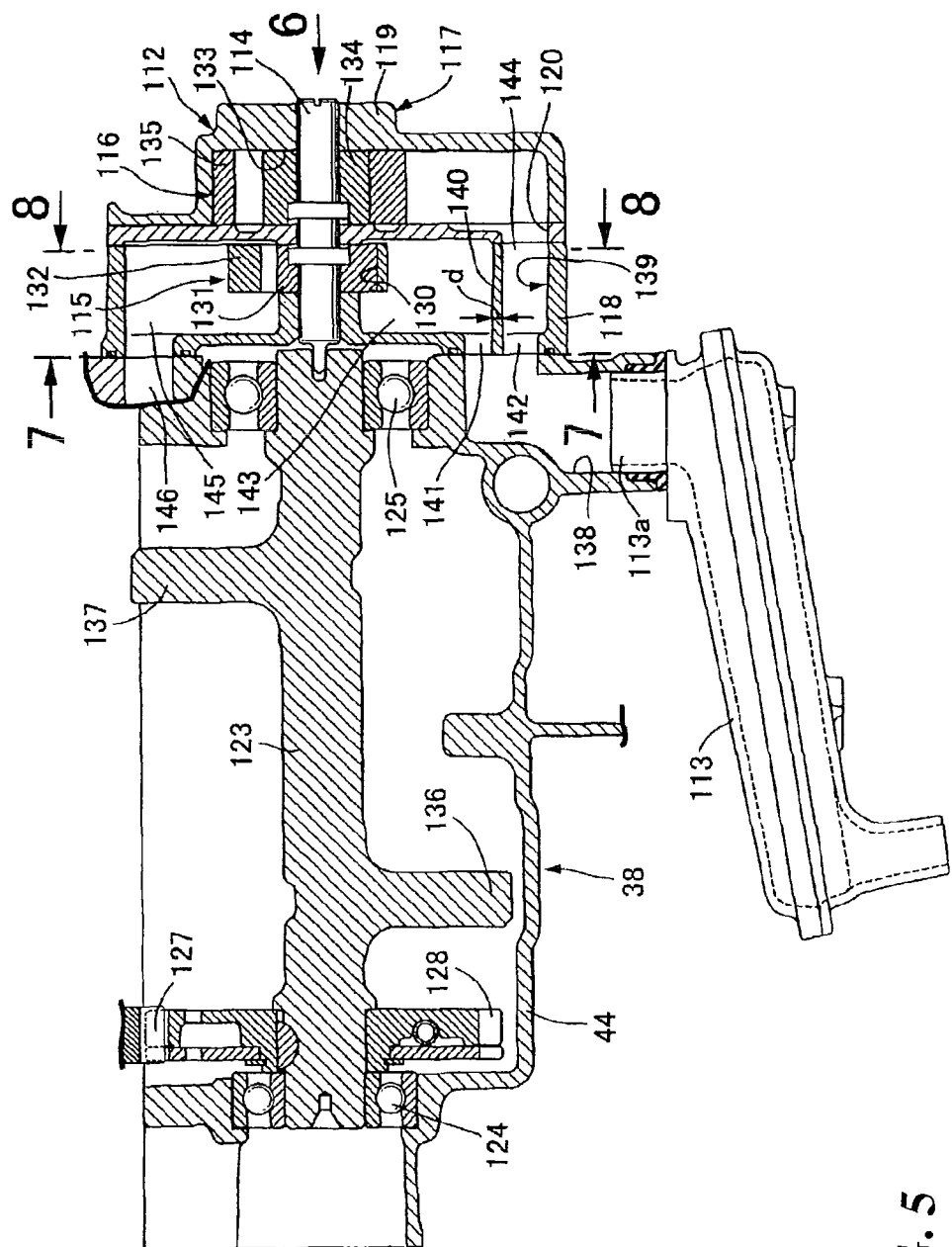
FIG. 5 is a sectional view taken along line 5-5 of FIGS. 2 and 6 and showing an oil pump unit and an oil strainer.
Figure 6:
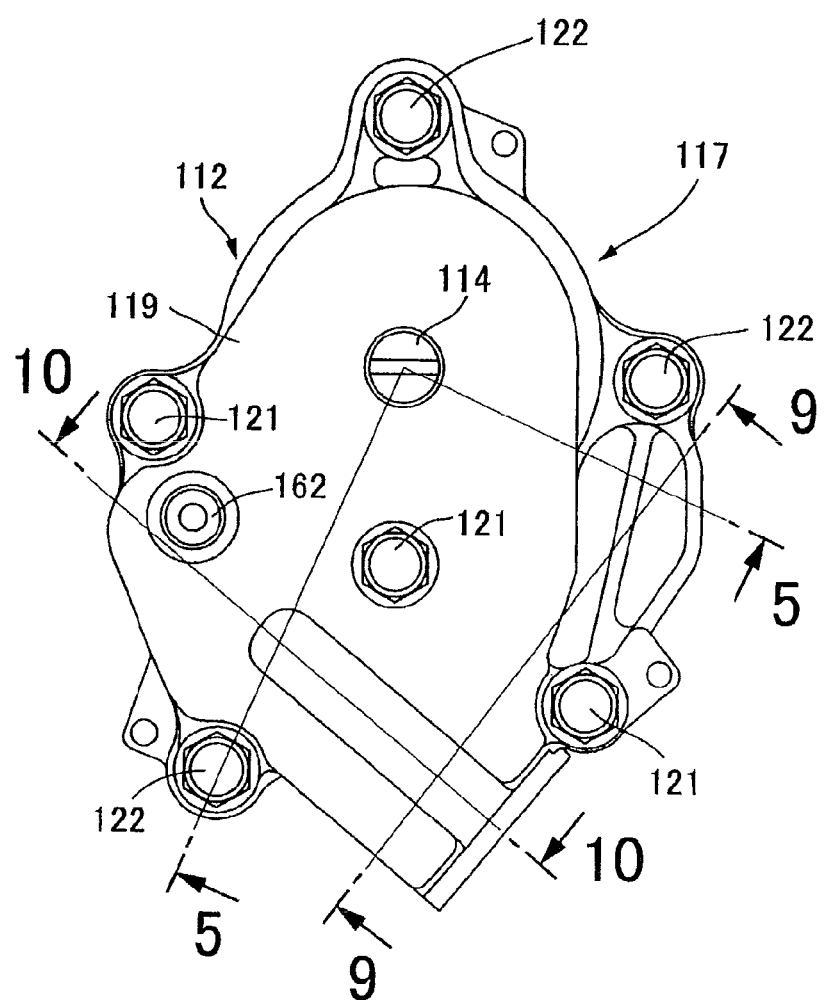
FIG. 6 is a view as viewed in the direction indicated by an arrow mark 6 of FIG. 5.

Referring to FIGS. 5 and 6, the oil pump unit 112 is configured from first and second oil pumps 115 and 116 having a common pump shaft 114 which rotates in an interlocking relationship with rotation of the crankshaft 37. A pump casing 117 common to the first and second oil pumps 115 and 116 is configured from a pump body 118 as a first case member, a pump cover 119 as a second case member, and a plate 120 in the form of a flat plate sandwiched between the pump body 118 and the pump cover 119. The pump body 118, plate 120 and pump cover 119 are fastened to each other by a plurality of, for example, three, bolts 121, 121, 121 to configure the pump casing 117. The pump casing 117 is attached to the crankcase 38 by a plurality of, for example, three, bolts 122, 122, 122 in such a manner that the pump body 118 is abutted with a lower portion of the right side wall of the lower case half 44 of the crankcase 38.

A balancer shaft 123 is supported for rotation on the lower case half 44 of the crankcase 38 such that it has an axial line parallel to the crankshaft 37, and ball bearings 124 and 125 are interposed between the balancer shaft 123 and the lower case half 44. The balancer shaft 123 is connected coaxially against relative rotation to the pump shaft 114.

A driving gear wheel 127 is securely mounted on the crankshaft 37 as shown in FIG. 3, and a driven gear wheel 128 which meshes with the driving gear wheel 127 is secured to the balancer shaft 123. Accordingly, the pump shaft 114 rotates in an interlocking relationship with rotation of the crankshaft 37.

The first oil pump 115 includes an inner rotor 131 secured to the pump shaft 114 and an outer rotor 132 for meshing with the inner rotor 131, and the inner rotor 131 and the outer rotor 132 are accommodated in a first pump chamber 130 formed between the pump body 118 and the plate 120. Meanwhile, the second oil pump 116 includes an inner rotor 134 secured to the pump shaft 114 and an outer rotor 135 for meshing with the inner rotor 134, and the inner rotor 134 and the outer rotor 135 are accommodated in a second pump chamber 133 formed between the pump cover 119 and the plate 120.

Incidentally, a pair of balance weights 136 and 137 are provided on the balancer shaft 123 in an individually corresponding relationship to a pair of cylinder bores 45, . . . of the cylinder block 39, and a connection path 138 is provided in the lower case half 44 of the crankcase 38 between the balance weight 137 on the oil pump unit 112 side from between the two balance weights 136 and 137 and the pump casing 117. The connection path 138 is open downwardly at one end thereof and is provided in such a manner as to fit liquidtight with a connecting tube portion 113a provided on the oil strainer 113 from below.

Figure 7:
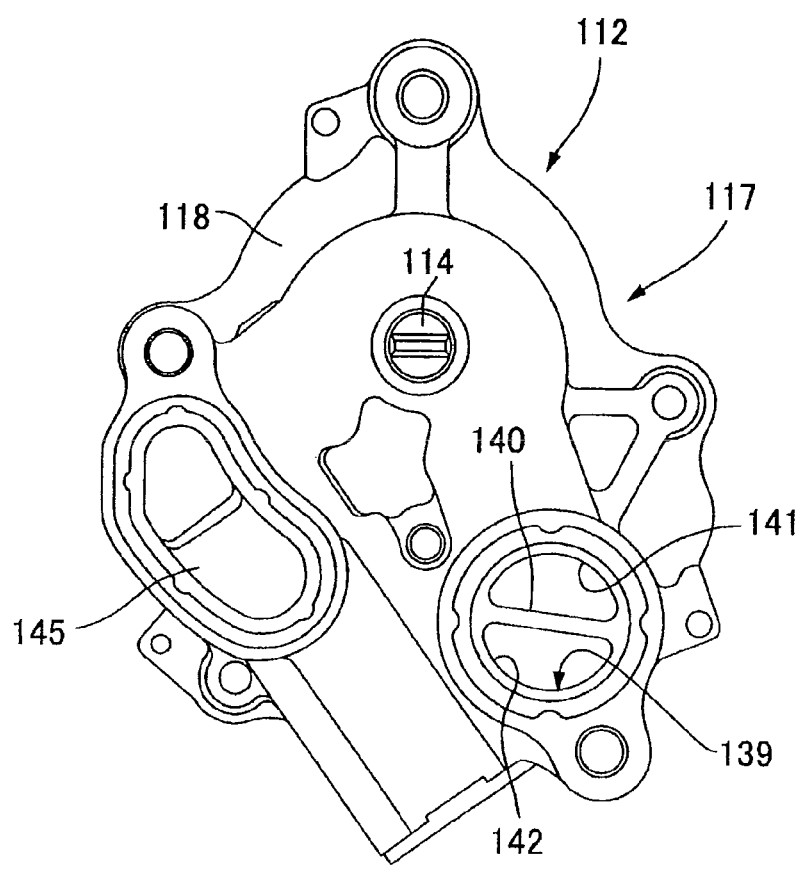
FIG. 7 is a view as viewed in the direction indicated by arrow marks along line 7-7 of FIG. 5.
Figure 8:
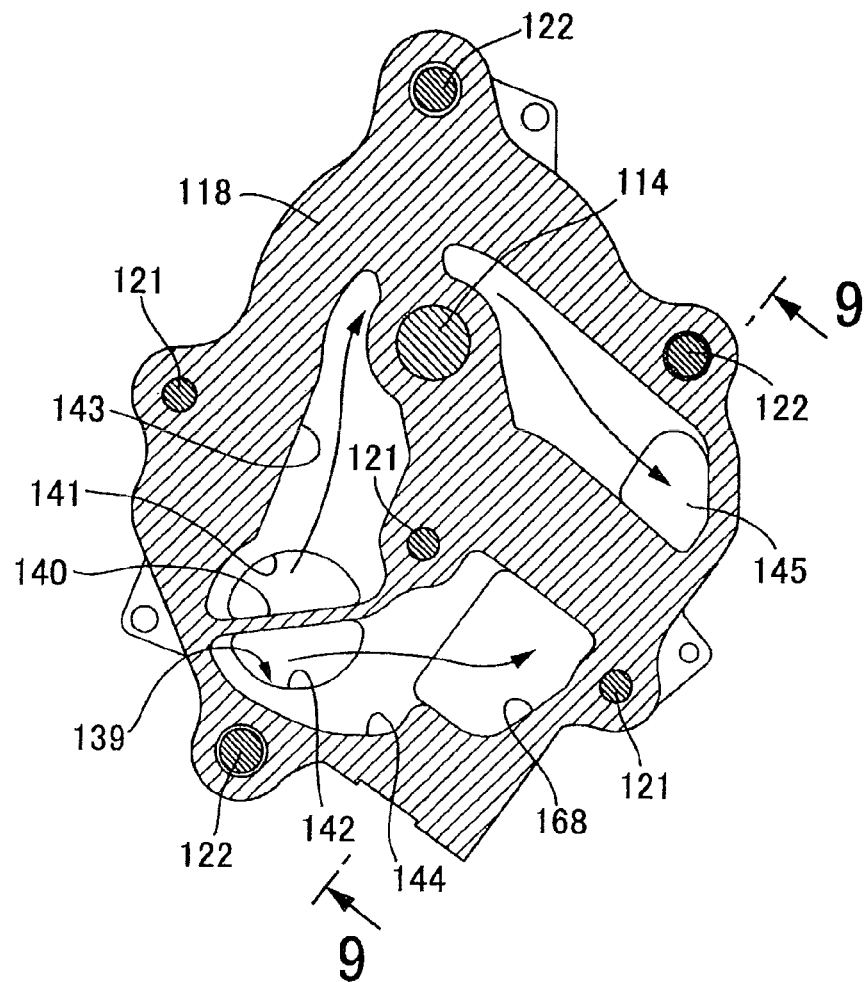
FIG. 8 is a sectional view taken along line 8-8 of FIG. 5.
Figure 9:
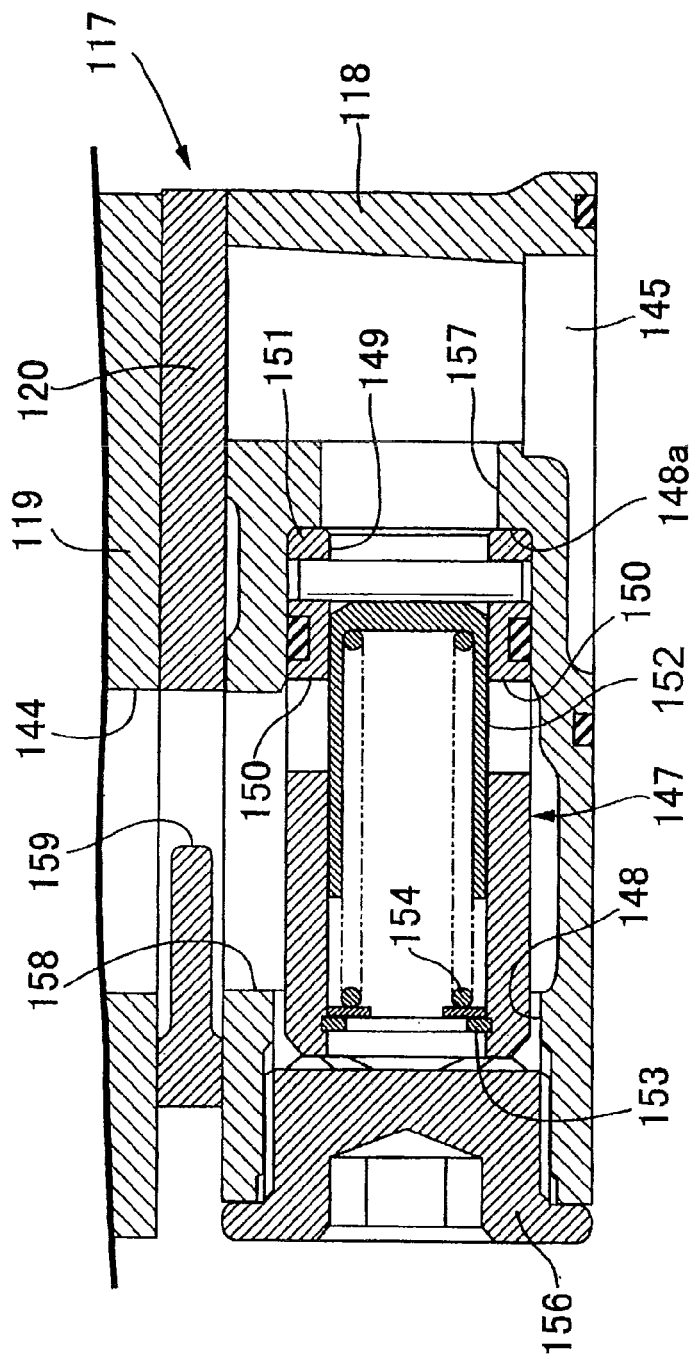
FIG. 9 is a sectional view taken along line 9-9 of FIGS. 6 and 8.

Referring also to FIGS. 7 and 8, an admission port 139 common to the first and second oil pumps 115 and 116 is provided in the pump body 118 of the pump casing 117 and is connected liquidtight to the other end portion of the connection path 138. In particular, the admission port 139 is open toward the inner side of the engine main body 32 in a direction along the axial direction of the balancer shaft 123 such that a connecting portion thereof to the oil strainer 113 is positioned between the balance weight 137 provided on the balancer shaft 123 and the pump casing 117.

The admission port 139 is divided into first and second admission ports 141 and 142 by a partition wall 140 provided integrally on the pump body 118 of the pump casing 117. The first and second admission ports 141 and 142 are connected commonly to the oil strainer 113.

Further, in the pump casing 117, a first intake path 143 extending from the first admission port 141 to the intake side of the first oil pump 115 and a second intake path 144 extending from the second admission port 142 to the intake side of the second oil pump 116 and independent of the first intake path 143 are formed. The first and second intake paths 143 and 144 are isolated from each other by the partition wall 140 and the plate 120.

Besides, the partition wall 140 is formed such that the width d thereof gradually increases from the plate 120 toward the admission port 139.

In the pump casing 117, a first discharge path 145 of the first oil pump 115 is formed in communication with an oil path 146 on the crankcase 38 side, and a first relief valve 147 connected to the first discharge path 145 is attached adjacent the plate 120 to the pump body 118.

The first relief valve 147 is accommodated in a bottomed relief valve accommodating hole 148 provided in the pump body 118 and includes a cylindrical valve housing 151 which is open at one end thereof as an entrance 149 and having a plurality of bleeding holes 150, 150, . . . provided at an intermediate portion thereof in the axial direction and spaced from each other in a circumferential direction. The first relief valve 147 further includes a valve body 152 formed in a bottomed cylindrical shape closed on the entrance 149 side and fitted for sliding movement in the valve housing 151, a snap ring 153 fitted on an circumference of the other end portion of the valve housing 151, and a spring 154 interposed between the snap ring 153 and the valve body 152. The first relief valve 147 further includes a restriction pin 155 provided on one end portion side of the valve housing 151 so as to restrict movement of the valve body 152 biased by the spring 154 toward the entrance 149 side.

A plug member 156 is screwed in an outer end of the relief valve accommodating hole 148 in such a manner as to cooperate with an inner end wall 148a of the relief valve accommodating hole 148 to sandwich the valve housing 151 therebetween. A communicating hole 157 is provided in the inner end wall 148a of the relief valve accommodating hole 148 such that it communicates the entrance 149 with the first discharge path 145.

In the first relief valve 147 configured in such a manner as described above, if the pressure in the first discharge path 145 becomes high, then the valve body 152 is retracted against the spring force of the spring 154 and the entrance 149 is communicated with the bleeding holes 150, 150, . . . . Consequently, part of oil flowing in the first discharge path 145 is discharged from the bleeding holes 150, 150, . . . .

A communicating hole 158 is provided on the plate 120 side of the pump body 118 in a communicating relationship with the bleeding holes 150, 150, . . . , and a communicating hole 159 is provided in the plate 120 such that it communicates the communicating hole 158 with the second intake path 144. In particular, oil discharged from the first relief valve 147 is introduced into the second intake path 144.

Figure 10:
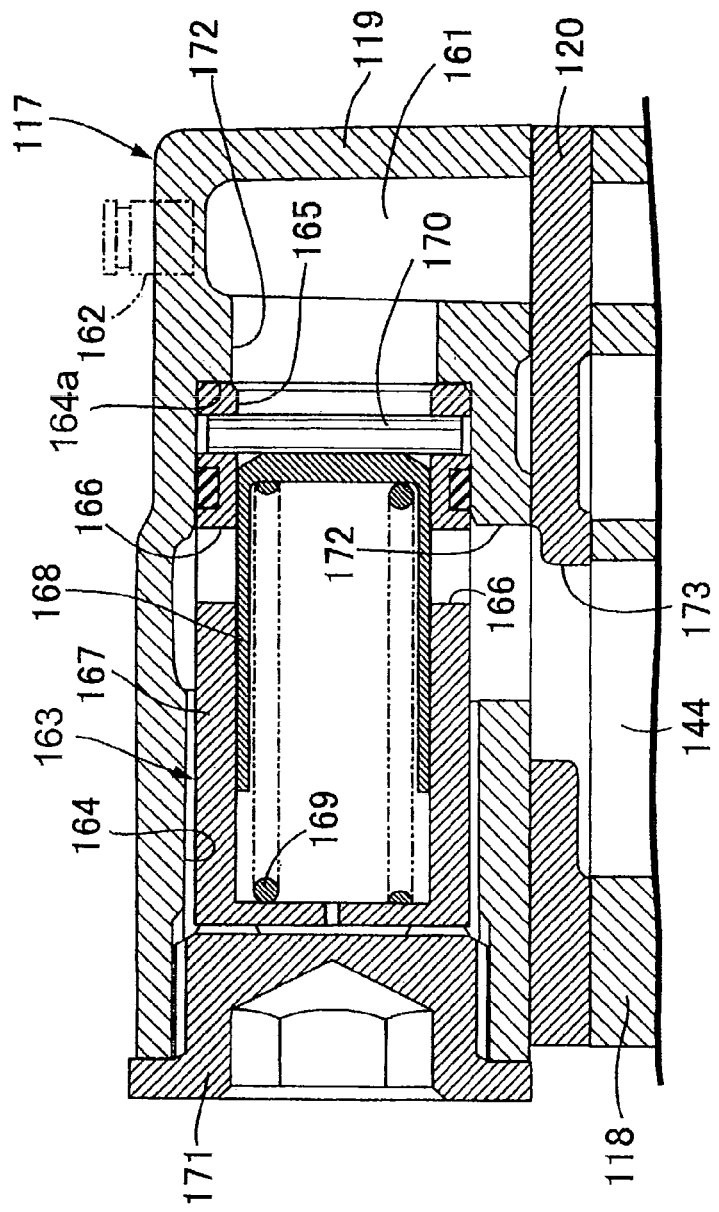
FIG. 10 is a sectional view taken along line 10-10 of FIG. 6.

Referring to FIG. 10, a second discharge path 161 of the second oil pump 116 is formed in the pump casing 117 between the pump cover 119 and the plate 120, and a connecting pipe 162 is attached in a projecting manner toward the clutch cover 58 side to the pump cover 119 and is communicated with the second discharge path 161. Further, a second relief valve 163 connected to the second discharge path 161 is attached to the pump cover 119.

The second relief valve 163 is accommodated in a bottomed relief valve accommodating hole 164 provided in the pump cover 119, and includes a valve housing 167 of a bottomed cylindrical shape open at one end thereof as a entrance 165 and having a plurality of bleeding holes 166, 166, . . . provided at an intermediate portion thereof in the axial direction and spaced from each other in a circumferential direction. The second relief valve 163 further includes a valve body 168 formed in a bottomed cylindrical shape closed on the entrance 165 side thereof and fitted for sliding movement in the valve housing 167, and a spring 169 interposed between a closed portion of the other end of the valve housing 167 and the valve body 168. The second relief valve 163 further includes a restriction pin 170 provided on one end portion side of the valve housing 167 so as to restrict movement of the valve body 168 biased by the spring 169 toward the entrance 165 side.

A plug member 171 is fitted at an outer end of the relief valve accommodating hole 164 so as to cooperate with an inner wall face 164a of the relief valve accommodating hole 164 to sandwich the valve housing 167 interposed therebetween, and a communicating hole 172 is provided in the inner wall face 164a of the relief valve accommodating hole 164 so as to communicate the entrance 165 with the second discharge path 161.

In the second relief valve 163 having such a configuration as described above, if the pressure in the second discharge path 161 becomes high, then the valve body 168 is retracted against the spring force of the spring 169 and the entrance 165 is communicated with the bleeding holes 166, 166, . . . . Consequently, part of oil flowing in the second discharge path 161 is discharged from the bleeding holes 166, 166, . . . .

Besides, the communicating hole 172 is provided in the pump cover 119 on the plate 120 side in a communicating relationship with the bleeding holes 166, 166, . . . , and a communicating hole 173 is provided in the plate 120 such that it communicates the communicating hole 172 with the second intake path 144. In particular, oil discharged from the second relief valve 163 is introduced into the second intake path 144.

Figure 11:
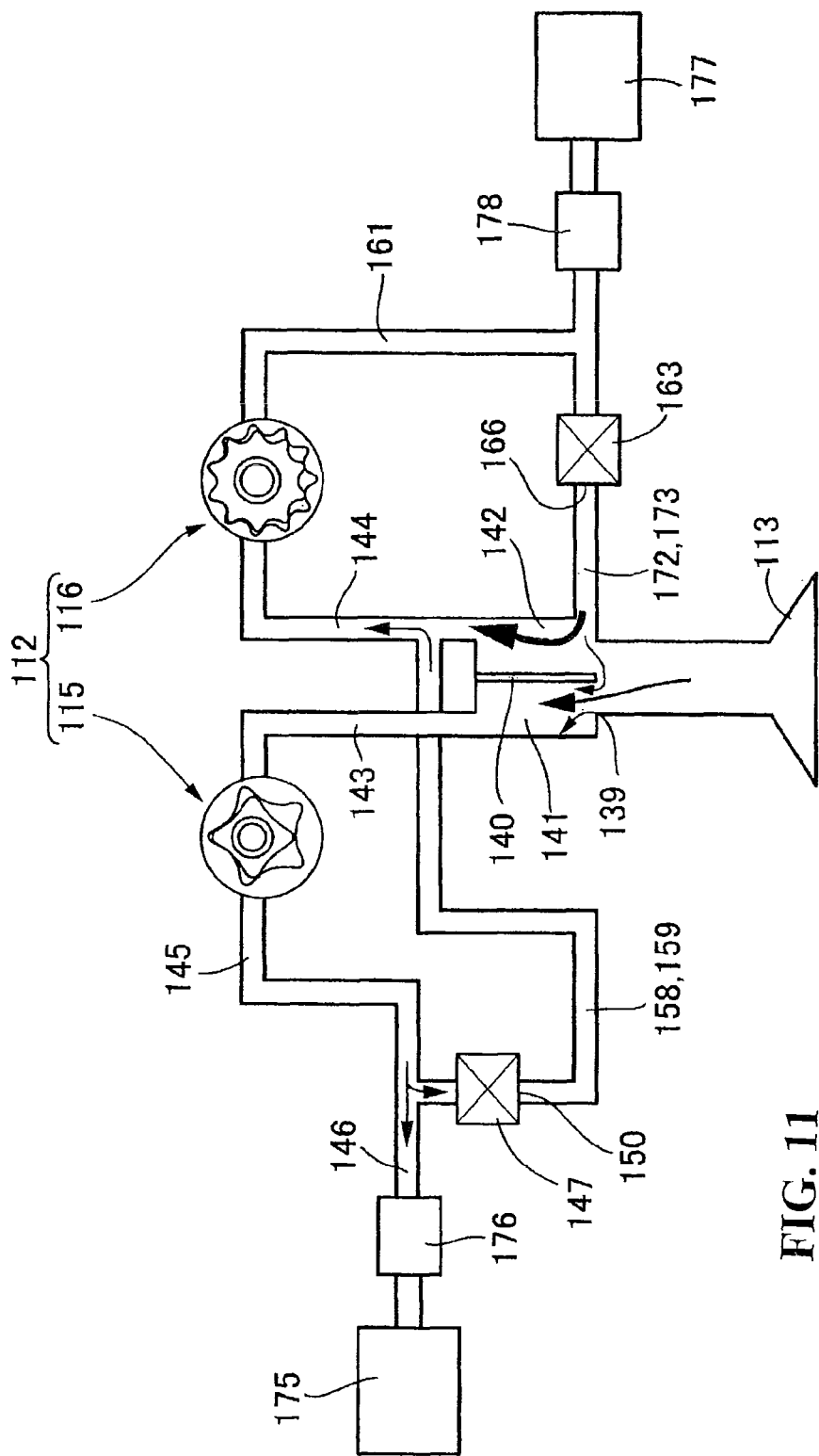
FIG. 11 is a view showing a configuration of an oil supplying system.

Referring to FIG. 11, the first oil pump 115 supplies oil for the lubrication to a plurality of lubrication object portions 175 of the engine main body 32 through a first oil filter 176. The second oil pump 116 is provided for supplying oil for the control to a hydraulic controlling apparatus 177 for the speed change gear M through a second oil filter 178. The first oil filter 176 is attached to a lower portion of a front wall of the crankcase 38 of the engine main body 32 as shown in FIG. 2. The second oil filter 178 is attached to a front side lower portion of the clutch cover 58.

Figure 12:
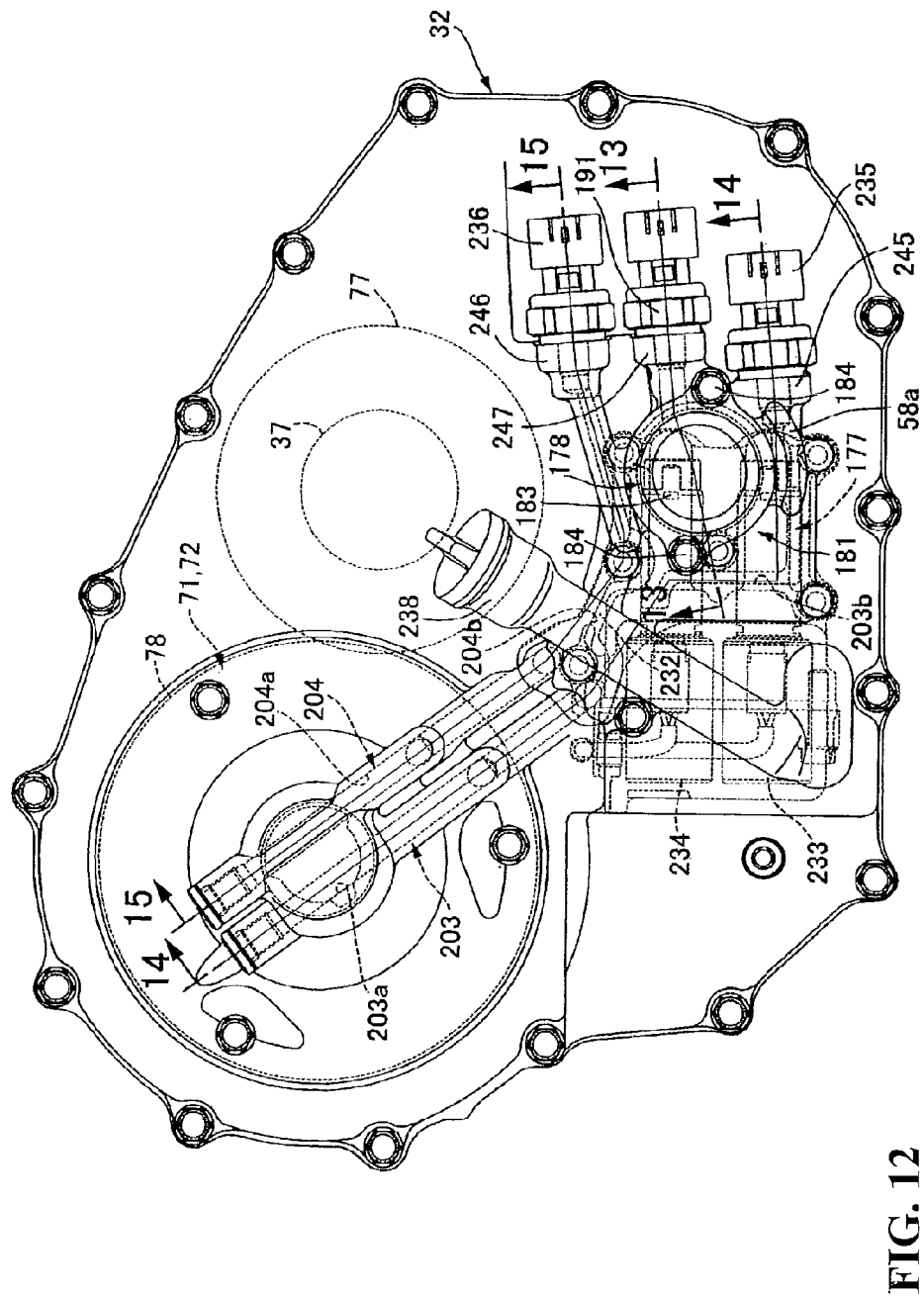
FIG. 12 is an enlarged view of essential part of FIG. 2.
Figure 13:
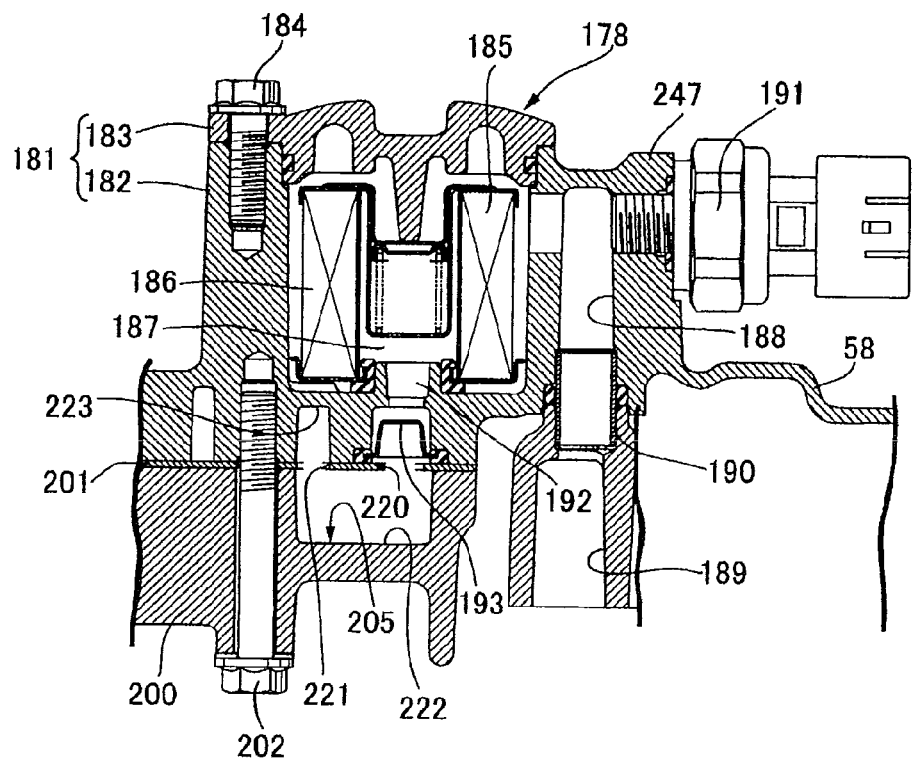
FIG. 13 is a view taken along line 13-13 of FIG. 12.

Referring to FIGS. 12 and 13, a filter case 181 of the second oil filter 178 has a cylindrical shape configured from a case main portion 182 of a bottomed cylindrical shape formed integrally on the clutch cover 58, and a lid member 183 coupled to the case main portion 182, for example, by a pair of bolts 184, 184. A filter medium 185 formed in a ring shape is inserted in and held by the filter case 181. A non-purification chamber 186 is formed between an outer periphery of the filter medium 185 and the filter case 181, and a purification chamber 187 is formed in the filter medium 185.

An entrance side path 188 is provided in a side wall of the case main portion 182 in a communicating relationship with the non-purification chamber 186, and a connecting path 189 is communicated with the entrance side path 188 through a connecting pipe 190 and communicates with the second discharge path 161 of the second oil pump 116. Oil discharged from the second oil pump 116 is supplied into the non-purification chamber 186.

Besides, an oil filter oil pressure sensor 191 for detecting a supply oil pressure to the second oil filter 178 is attached to the case main portion 182 of the filter case 181 such that an axial line thereof extends transversely to the axial line of the filter case 181 and an end of the oil filter oil pressure sensor 191 faces the entrance side path 188.

Further, an outer end of the lid member 183 is disposed outwardly of an outer end of the oil filter oil pressure sensor 191 which extends along an axial direction of the filter case 181 of the second oil filter 178 as shown in FIG. 13.

Further, an exit path 192 is provided in the clutch cover 58 in a communicating relationship with the purification chamber 187, and a filter 193 is mounted in the exit path 192.

Figure 14:
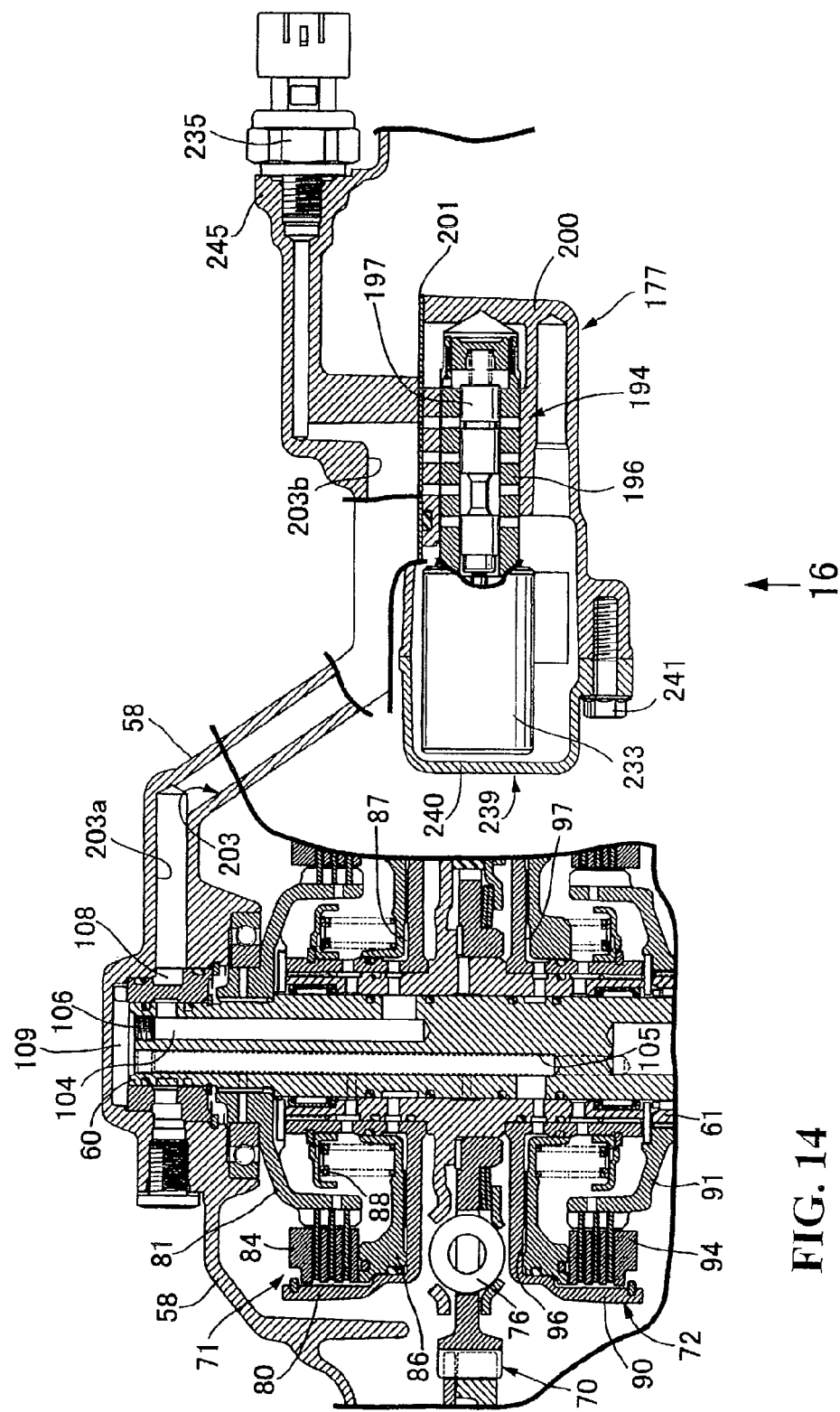
FIG. 14 is a view taken along line 14-14 of FIG. 12.
Figure 15:
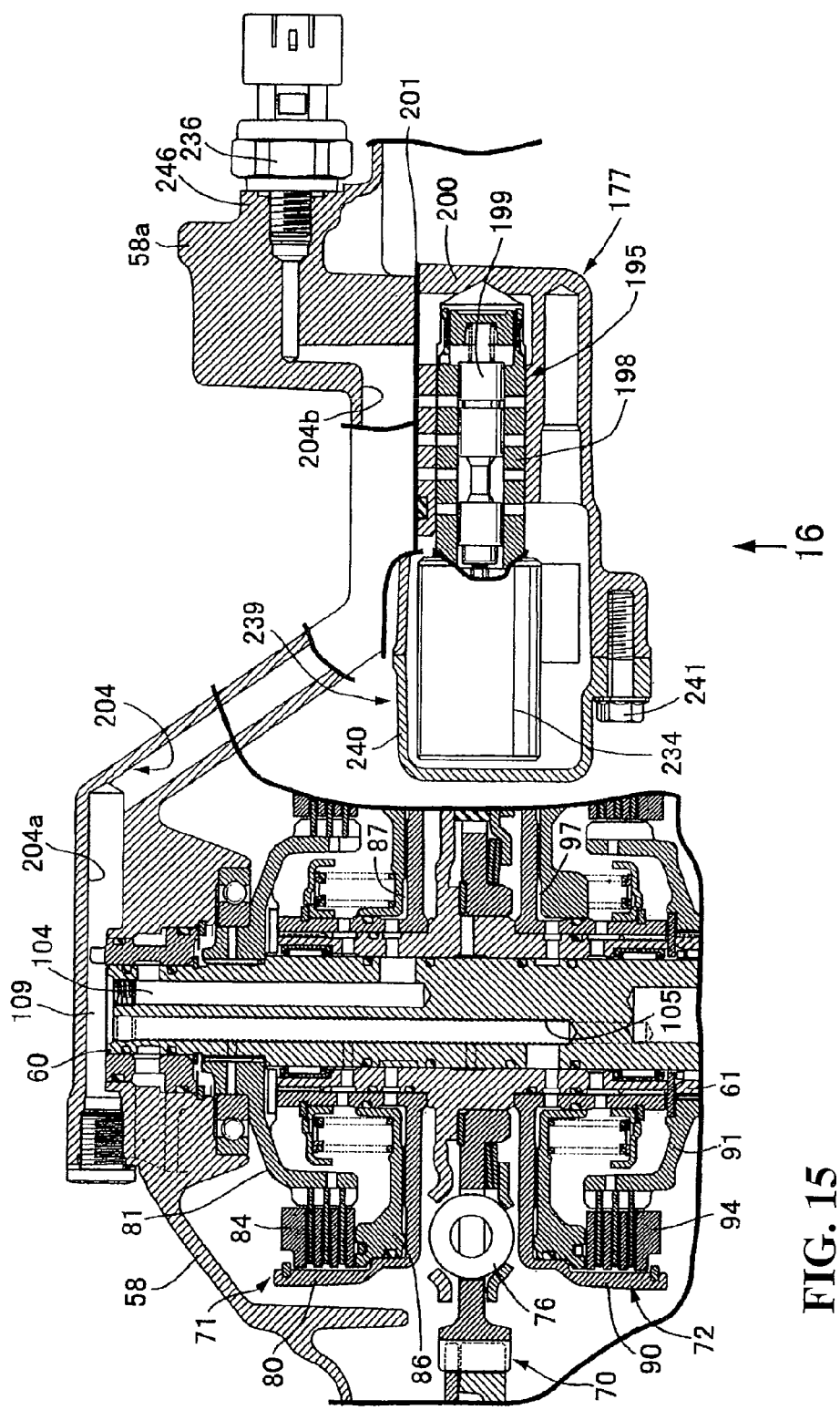
FIG. 15 is a view taken along line 15-15 of FIG. 12.
Figure 16:
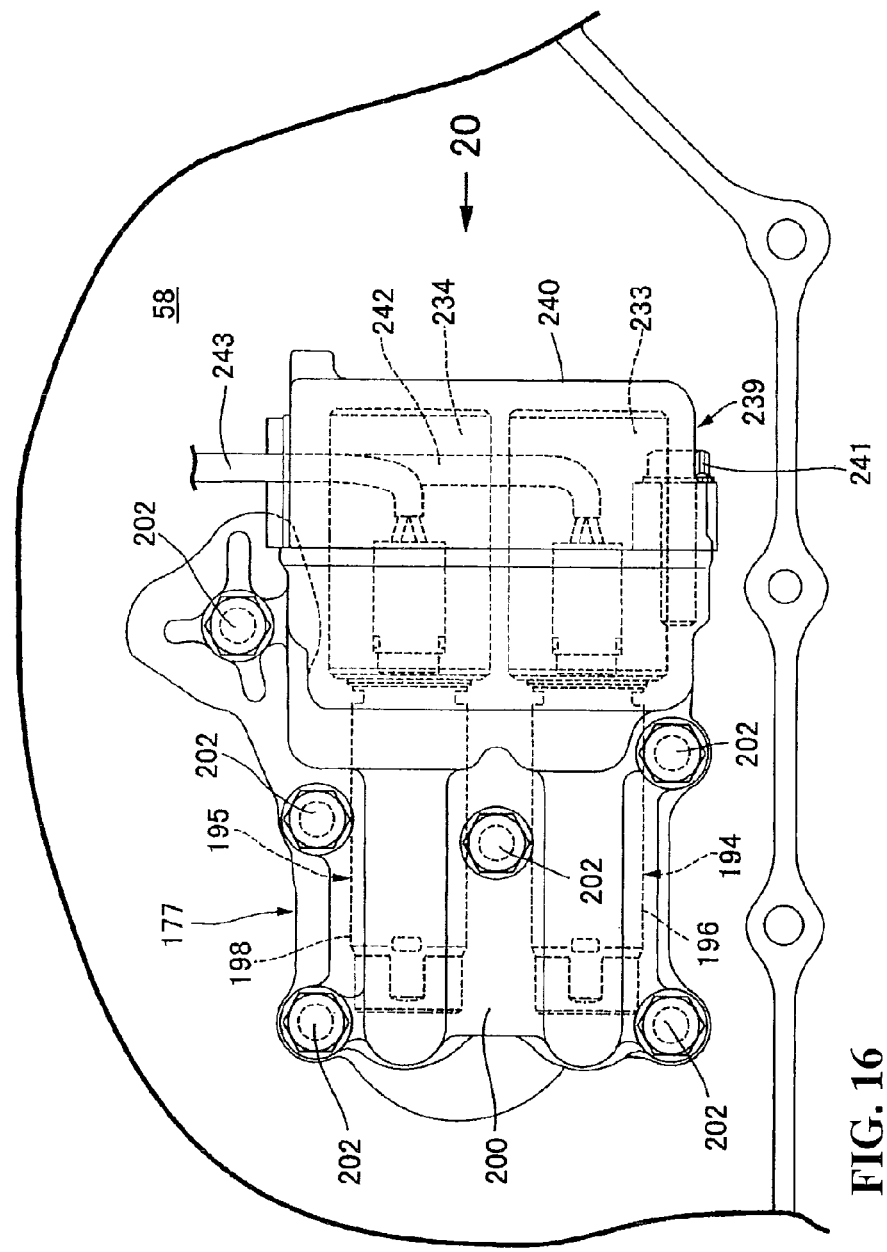
FIG. 16 is a view as viewed in the direction indicated by an arrow mark 16 of FIGS. 14 and 15.

Referring also to FIGS. 14 to 16, the hydraulic controlling apparatus 177 of the speed change gear M is configured from a first oil pressure controlling valve 194 for controlling the oil pressure for the first hydraulic clutch 71 and a second oil pressure controlling valve 195 for controlling the oil pressure for the second hydraulic clutch 72, and is disposed on the inner face side of the clutch cover 58. Besides, the first and second oil pressure controlling valves 194 and 195 are linear solenoids having valve housings 196 and 198, and spool valve bodies 197 and 199 accommodated in the valve housings 196 and 198.

The first and second oil pressure controlling valves 194 and 195 are inserted in and held by a support holder 200 and extend in parallel to each other. The support holder 200 is attached to an inner face side of the clutch cover 58 such that a partition member 201 in the form of a flat plate is interposed between the clutch cover 58 and the valve housings 196 and 198. In a state in which the support holder 200 is attached to the clutch cover 58, the axial lines of the first and second oil pressure controlling valves 194 and 195 extend horizontally. Besides, the support holder 200 is attached to the clutch cover 58 by a plurality of, for example, six, bolts 202, 202, ... in such a manner as to cooperate with the inner face of the clutch cover 58 to sandwich the partition member 201 interposed therebetween.

Incidentally, the first and second oil pressure controlling valves 194 and 195 and the first and second hydraulic clutches 71 and 72 are individually coupled to each other by first and second controlling oil supply oil paths 203 and 204, respectively. First and second cover side supply oil paths 203a and 204a which configure part of the first and second controlling oil supply oil paths 203 and 204 are provided in the clutch cover 58 such that they are inclined rearwardly upwards toward the first main shaft 60 side from the hydraulic controlling apparatus 177. The first cover side supply oil path 203a is communicated at a downstream end thereof with the first oil chamber 108 which communicates with the first pressure oil chamber 87 of the first hydraulic clutch 71, and the second cover side supply oil path 204a is communicated at a downstream end thereof with the second oil chamber 109 which communicates with the second pressure oil chamber 97 of the second hydraulic clutch 72.

On the opposite faces side of the partition member 201, that is, on a face of the partition member 201 on the clutch cover 58 side and a face of the partition member 201 on the support holder 200 side, first and second controlling valve side supply oil paths 203b and 204b are formed. The first and second controlling oil supply oil paths 203 and 204 are individually communicated with the first and second cover side supply oil paths 203a and 204a in such a manner as to configure the first and second controlling oil supply oil paths 203 and 204 together with the first and second cover side supply oil paths 203a and 204a and cross with the first and second cover side supply oil paths 203a and 204a. Further, a supply oil path 205 (refer to FIG. 13) from the second oil filter 178 to the first and second oil pressure controlling valves 194 and 195 is formed on the opposite faces side of the partition member 201.

Figure 17:
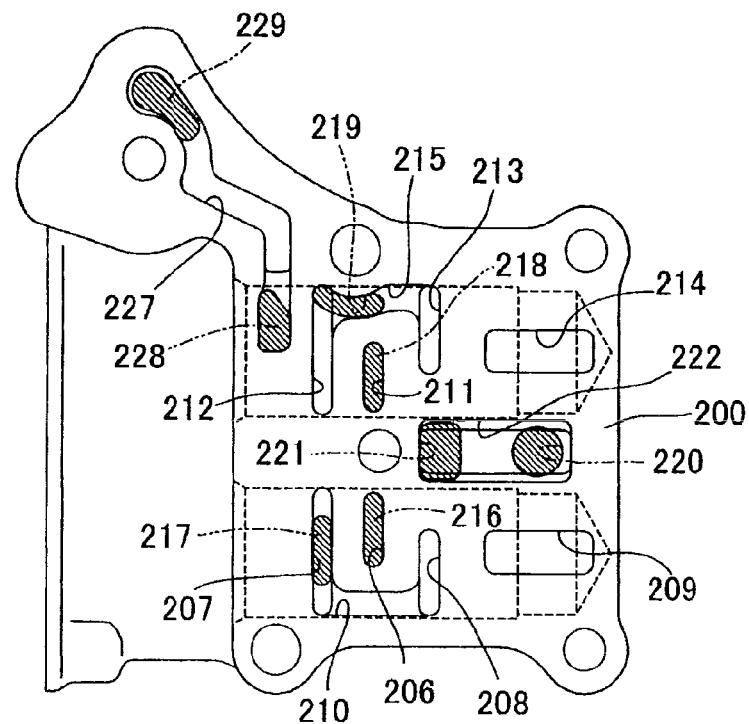
FIG. 17 is a view showing a face of a support holder which faces a partition member in such a manner that a communicating portion with a hole of the partition member is indicated by slanting lines.

Referring to FIG. 17, in the support holder 200, an entrance hole 206, an exit hole 207, a feedback hole 208 and a spill hole 209 are provided in a communicating relationship with an input port, an output port, a feedback port and a drain port of the first oil pressure controlling valve 194, respectively. Further, in the support holder 200, an entrance hole 211, an exit hole 212, a feedback hole 213 and an spill hole 214 are provided in a communicating relationship with an input port, an output port, a feedback port and a drain port of the second oil pressure controlling valve 195, respectively. A groove 210 for interconnecting the exit hole 207 and the feedback hole 208 and another groove 215 for interconnecting the exit hole 212 and the feedback hole 213 are provided on a face of the support holder 200 which faces the partition member 201.

Figure 18:
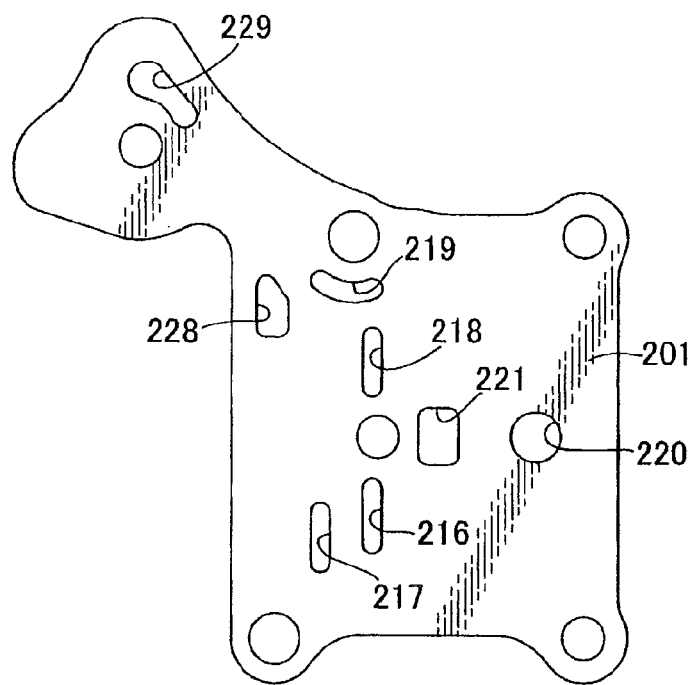
FIG. 18 is a side elevational view showing the partition member as viewed from a clutch cover side.
Figure 19:
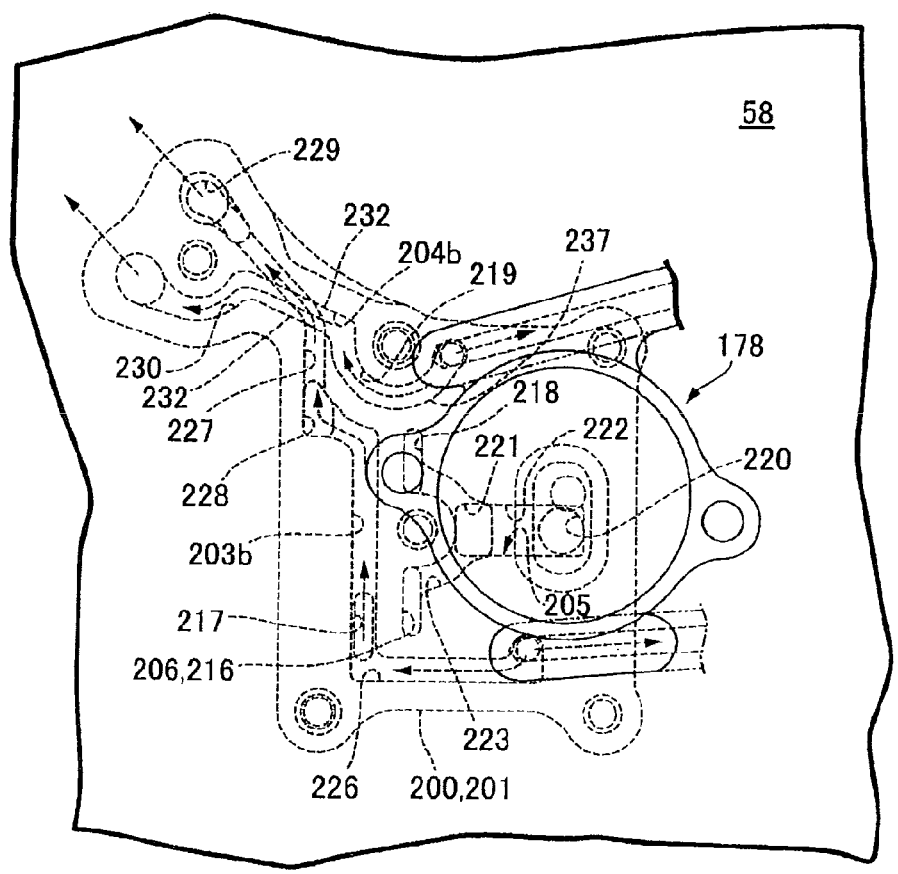
FIG. 19 is a view showing arrangement of a control valve side supplying oil path as viewed from an outer face side of a clutch cover.

Meanwhile, as shown in FIG. 18, in the partition member 201, through-holes 216 and 217 corresponding to the entrance hole 206 and the exit hole 207 provided on the support holder 200 on the first oil pressure controlling valve 194 side, respectively, are provided in such a manner that, when the partition member 201 is sandwiched between the support holder 200 and the clutch cover 58, they are communicated with the entrance hole 206 and the exit hole 207 as indicated by slanting lines in FIG. 17, respectively. Further, through-holes 218 and 219 corresponding to the entrance hole 211 and the exit hole 212 provided in the support holder 200 on the second oil pressure controlling valve 195 side, respectively, are provided such that, when the partition member 201 is sandwiched between the support holder 200 and the clutch cover 58, they are communicated with the entrance hole 211 and the exit hole 212 as indicated by slanting lines in FIG. 17, respectively.

Further, in the partition member 201, a through-hole 220 communicating with the exit path 192 of the hydraulic controlling apparatus 177 and a hole 221 communicating with a groove 222 are provided. The hole 221 is communicated at one end thereof with the through-hole 220, extends in a direction along the axial line of the first and second oil pressure controlling valves 194 and 195 toward a face of the support holder 200 which faces the partition member 201 and is communicated at the other end thereof with the hole 221. On a face of the clutch cover 58 which faces the partition member 201, a groove 223 is provided in a curved state such that it communicates the hole 221 with the through-holes 216 and 218.

The supply oil path 205 from the second oil filter 178 to the first and second oil pressure controlling valves 194 and 195 is configured from the through-hole 220 of the partition member 201, groove 222 of the support holder 200, hole 221 of the partition member 201, groove 223 of the clutch cover 58, through-holes 216 and 218 of the partition member 201 and entrance holes 206 and 211 of the support holder 200. Part of the supply oil path 205 is configured from grooves 222 and 223 provided on the support holder 200 and the clutch cover 58 which face the opposite faces of the partition member 201.

On a face of the support holder 200 which faces the partition member 201 side and a face of the clutch cover 58 which faces the partition member 201, grooves 226 and 227 are provided such that they cooperate with the opposite faces of the partition member 201 to configure the first and second controlling valve side supply oil paths 203b and 204b.

In particular, on the face of the clutch cover 58 which faces the partition member 201, the groove 226 is provided such that it communicates with the through-hole 220 of the support holder 200 through the exit hole 207 of the partition member 201. The groove 226 is communicated with a through-hole 228 provided in the partition member 201. A groove 227 is provided on a face of the support holder 200 which faces the partition member 201 such that it is communicated with the through-hole 228, and a through-hole 229 is provided in the partition member 201 such that it is communicated with the other end of the groove 227. The through-hole 229 is communicated with the first cover side supply oil path 203a.

On a face of the clutch cover 58 which faces the partition member 201, a groove 230 is provided which cooperates with a face of the partition member 201 on the clutch cover 58 side to configure the second controlling valve side supply oil path 204b.

In particular, on the face of the clutch cover 58 which faces the partition member 201, the groove 230 is provided which is communicated with the exit hole 212 of the support holder 200 through the through-hole 219 of the partition member 201. The groove 230 is communicated with the second cover side supply oil path 204a.

Besides, the first and second controlling valve side supply oil paths 203b and 204b cross with each other, and the groove 227 provided on the support holder 200 and configuring part of the first controlling valve side supply oil path 203b and the groove 230 provided on the clutch cover 58 and configuring part of the second controlling valve side supply oil path 204b are disposed on the opposite sides of the partition member 201 such that the first and second controlling valve side supply oil paths 203b and 204b cross with each other. The crossing portion 232 between them is disposed on the outside of a projection range of the first oil pressure controlling valve 194 in the direction of the axial line of the crankshaft 37.

Incidentally, solenoids 233 and 234 which are actuators for driving the spool valve bodies 197 and 199 are provided for the first and second oil pressure controlling valves 194 and 195, respectively. The first and second oil pressure controlling valves 194 and 195 for which the solenoids 233 and 234 are provided are disposed below the primary driving gear wheel 77 disposed at an end of the crankshaft 37 in a side elevation as viewed in a direction along the axial line of the crankshaft 37, and the first and second controlling valve side supply oil paths 103b and 104b are disposed in a crossing relationship with each other between the solenoids 233 and 234 and the primary driving gear wheel 77 as viewed in side elevation. In particular, the crossing portion 232 is disposed between the solenoids 233 and 234 and the primary driving gear wheel 77 as viewed in side elevation.

First and second clutch oil pressure sensors 235 and 236 are individually disposed at an end portion of the first and second controlling valve side supply oil paths 203b and 204b on the opposite side to the first and second cover side supply oil paths 203a and 204a. The first and second clutch oil pressure sensors 235 and 236 are disposed closely with and in parallel to each other on the clutch cover 58 of the engine main body 32 such that the axes thereof are directed in the forward and backward direction in a state in which the engine main body 32 is mounted on the motorcycle.

Meanwhile, the second oil filter 178 having the cylindrical filter case 181 is disposed in the clutch cover 58. In particular, the second oil filter 178 is disposed on the clutch cover 58 such that the axial line of the filter case 181 extends in a direction perpendicular to the axial lines of the first and second clutch oil pressure sensors 235 and 236 and is displaced forwardly and backwardly from the first and second clutch oil pressure sensors 235 and 236 in a state in which the engine main body 32 is mounted on the motorcycle.

Besides, the first and second clutch oil pressure sensors 235 and 236 and the oil filter oil pressure sensor 191 are disposed in parallel to each other such that the oil filter oil pressure sensor 191 is sandwiched between the first and second clutch oil pressure sensors 235 and 236.

Besides, as shown in FIGS. 12 and 15, a projection 58a is provided in a projecting manner on the clutch cover 58 such that it is positioned in the proximity of the first clutch oil pressure sensor 235. The projection 58a projects outwardly sidewardly farther than the first clutch oil pressure sensor 235 which is a lowermost oil pressure sensor from among the first clutch oil pressure sensor 235, second clutch oil pressure sensor 236 and oil filter oil pressure sensor 191.

Further, a front face lower portion of the crankcase 38 and the clutch cover 58 of the engine main body 32 is formed in a curved state such that it is positioned rearwardly toward the lower side as shown in FIGS. 2 and 12. A attaching boss 245 is disposed at a position displaced rearwardly from attaching bosses 246 and 247 for attaching the second clutch oil pressure sensor 236 and the oil filter oil pressure sensor 191 to the clutch cover 58. The attaching boss 245 is provided for attaching the first clutch oil pressure sensor 235, which is a lowermost oil pressure sensor from among the first clutch oil pressure sensor 235, second clutch oil pressure sensor 236 and oil filter oil pressure sensor 191, to the clutch cover 58 of the engine main body 32.

The first clutch oil pressure sensor 235, second clutch oil pressure sensor 236 and oil filter oil pressure sensor 191 are disposed on the clutch cover 58 which is a side wall of the engine main body 32 on one end side in the axial line direction of the crankshaft 37. However, the first clutch oil pressure sensor 235, second clutch oil pressure sensor 236 and oil filter oil pressure sensor 191 are disposed forwardly of the crankshaft 37 and downwardly of the first and second hydraulic clutches 71 and 72.

A lubricating oil pressure sensor 248 is attached to a front face of the crankcase 38 of the engine main body 32 so as to be disposed forwardly of the first clutch oil pressure sensor 235, second clutch oil pressure sensor 236 and oil filter oil pressure sensor 191 and is provided for detecting a supply oil pressure of lubricating oil to be supplied to the lubrication object portions 175 at a plurality places.

A semicircular arcuate portion 237 is formed at part of the second controlling valve side supply oil path 204b and disposed along a periphery of one of the six bolts 202, 202, . . . such that it bypasses the bolt 202 for fastening the support holder 200, which cooperates with the clutch cover 58 to sandwich the partition wall 201 therebetween, to the clutch cover 58. The through-hole 219 provided in the partition member 201 and the groove 230 provided on the clutch cover 58 configure the arcuate portion 237.

Incidentally, a level gage insertion tube 238 is disposed on the outer side of the clutch cover 58 corresponding to the portion at which the first and second controlling valve side supply oil paths 203b and 204b cross with each other, that is, corresponding to the crossing portion 232. The level gage insertion tube 238 extends upwardly from a lower portion of the clutch cover 58 and is positioned rearwardly of the second oil filter 178 as shown in FIG. 12.

Figure 20:
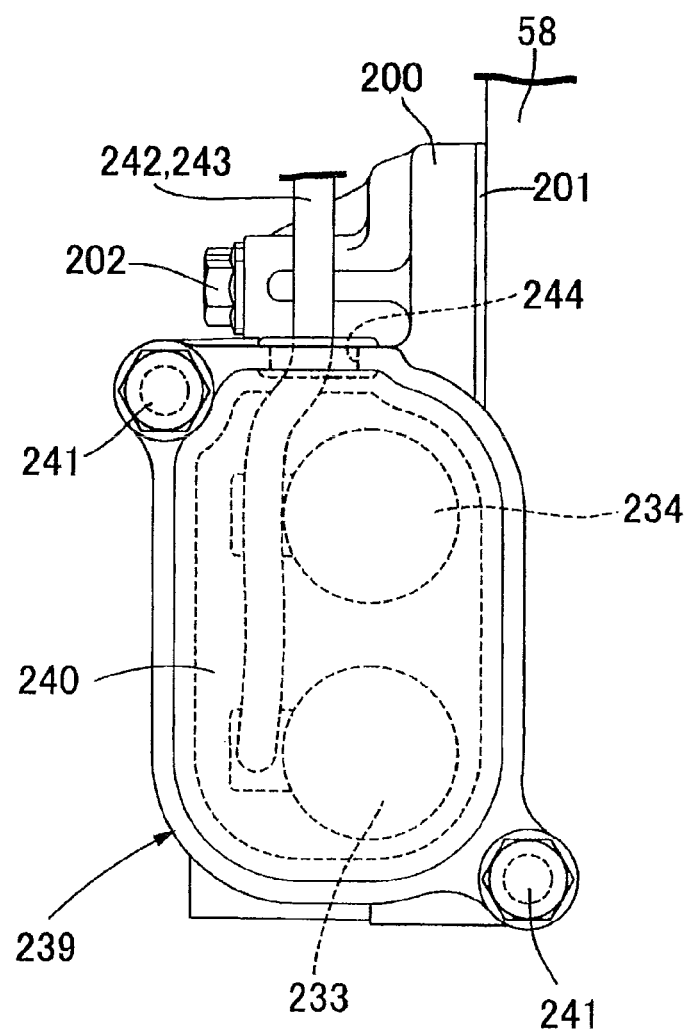
FIG. 20 is a view as viewed in the direction indicated by an arrow mark 20 of FIG. 16.

Referring also to FIG. 20, an accommodating portion 239 for accommodating the solenoids 233 and 234 is provided in the support holder 200 and is configured from the support holder 200 and the cover member 240 fastened to the support holder 200 by bolts 241, 241. A cable extracting hole 244 is provided at an upper portion of the accommodating portion 239 rearwardly of the first and second controlling valve side supply oil paths 203b and 204b and used for taking out cables 242 and 243 connected to the solenoids 233 and 234 therethrough, respectively.

Now, operation of the present embodiment is described. The admission port 139 common to the first and second oil pumps 115 and 116 is divided into the first admission port 141 of the first intake path 143 connecting to the first oil pump 115 and the second admission port 142 of the second intake path 144 connecting to the second oil pump 116 and independent of the first intake path 143 by the partition wall 140, and the bleeding ports 150 and 166 of the first and second relief valves 147 and 163 are connected to the second intake path 144 of the second oil pump 116 side. Therefore, even where oil discharged from the first relief valve 147 of the second oil pump 116 is sucked by the second oil pump 116 and a circulating circuit for oil is configured on the second oil pump 116 side, by allowing oil to overflow from the circulating circuit to the intake path side of the first oil pump 116, the oil to be sucked into the second oil pump 116 side is reduced. Further, in the case of oil in which air is mixed much, it is possible to prevent an influence of air from being had on the second oil pump 116 side, and increase in size of the first oil pump 115 can be prevented.

Since the first and second admission ports 141 and 142 are connected commonly to the single oil strainer 113 which is common to the first and second oil pumps 115 and 116, the number of parts can be reduced by using the single oil strainer 113.

Lubricating oil is supplied to the lubrication object portions 175 of the engine main body 32 by the first oil pump 115, and oil pressure controlling oil is supplied to the hydraulic controlling apparatus 177 of the speed change gear M by the second oil pump 116. When the hydraulic controlling apparatus 177 is inoperative, in a state in which an oil circulating circuit is configured on the second oil pump 116 side, shortage of the oil supplying amount to the lubrication object portions 175 of the engine main body 32 can be prevented from occurring. Thereupon, even if a substantially whole amount of oil taken in from the oil strainer 113 is sucked by the first oil pump 115 and oil in which air is mixed is taken in from the oil strainer 113, the oil in which air is mixed can be introduced readily to the lubrication object portions 175 side of the engine main body 32 with which no problem occurs even if oil in which air is mixed is supplied thereto.

The pump casing 117 is configured from the pump body 118 and the pump cover 119, and the plate 120 sandwiched between the pump body 118 and the pump cover 119 such that the pump chambers 130 and 133 of the first and second oil pumps 115 and 116 are formed between the pump body 118 and the pump cover 119. Further, the first and second intake paths 143 and 144 are isolated from each other by the partition wall 140 and the plate 120 provided integrally on the pump body 118 from between the pump body 118 and the pump cover 119. Therefore, a structure for isolating the first and second intake paths 143 and 144 from each other to form the pump casing 117 can be formed simply.

Since the communicating hole 159 for communicating the bleeding port 150 of the first relief valve 147 with the second intake path 144 is provided in the plate 120 positioned adjacent the first relief valve 147, oil discharged from the first relief valve 147 can be introduced into the second intake path 144 by a simple structure.

Since the partition wall 140 is disposed such that, in a state in which the engine main body 32 is mounted on the motorcycle, it divides the admission port 139 upwardly and downwardly, even if oil is one-sided in the forward or backward direction in the admission port 139 by acceleration or deceleration of the motorcycle, a variation in oil circulating amount in the first and second intake paths 143 and 144 can be prevented.

The admission port 139 is connected to the oil strainer 113 between the balance weight 137, which is provided on the balancer shaft 123 connected coaxially against relative rotation on the pump shaft 114, and the pump casing 117. Consequently, the admission port can be connected to the oil strainer 113 effectively utilizing the space between the balance weight 137 and the pump casing 117.

Besides, since the width d of the partition wall 140 gradually increases toward the admission port 139 side, the rigidity at an end portion of the partition wall 140 which is a portion with which the taken in oil collides can be raised.

In the clutch cover 58 which configures part of the engine main body 32 to cover the first and second hydraulic clutches 71 and 72, the first and second cover side supply oil paths 203a and 204a which configure part of the first and second controlling oil supply oil paths 203 and 204 which individually interconnect the first and second oil pressure controlling valves 194 and 195 and the first and second hydraulic clutches 71 and 72, respectively, are provided. The partition member 201 is interposed between the clutch cover 58 and the valve housings 196 and 198 of the first and second oil pressure controlling valves 194 and 195, and the first and second controlling oil supply oil paths 203 and 204 are configured together with the first and second cover side supply oil paths 203a and 204a and the first and second controlling valve side supply oil paths 203b and 204b which are individually communicated with the first and second cover side supply oil paths 203a and 204a and cross with each other are formed on the opposite face sides of the partition member 201. Consequently, by causing the first and second controlling valve side supply oil paths 203b and 204b to extend between the one face side and the other face side of the partition member 201, it is easy to cause the first and second controlling valve side supply oil paths 203b and 204b to cross with each other. Since the partition member 201 may be very thin, the first and second controlling valve side supply oil paths 203b and 204b can be disposed so as to cross with other without making the clutch cover 58 thicker, and increase in size of the internal combustion engine E can be prevented.

Further, the support holder 200 which holds the first and second oil pressure controlling valves 194 and 195 is attached to the clutch cover 58 such that it cooperates with the clutch cover 58 to sandwich the partition member 201 therebetween, and the grooves 226, 227 and 230 which cooperate with the opposite faces of the partition member 201 to configure the first and second controlling valve side supply oil paths 203b and 204b are provided on a face of the support holder 200 which faces the partition member 201 side and a face of the clutch cover 58 which faces the partition member 201. Therefore, even if the route of the first and second controlling valve side supply oil paths 203b and 204b is complicated, only grooving is required, and consequently, the first and second controlling valve side supply oil paths 203b and 204b can be formed simply.

The first and second oil pressure controlling valves 194 and 195 for which the solenoids 233 and 234 are provided are disposed, in a side elevation as viewed in a direction along the axial line of the crankshaft 37, below the primary driving gear wheel 77, and the first and second controlling valve side supply oil paths 203b and 204b are disposed in a crossing relationship between the solenoids 233 and 234 and the primary driving gear wheel 77 as viewed in the side elevation. Therefore, even if the space between the actuators and the primary driving gear wheels is narrowed, the first and second controlling valve side supply oil paths 203b and 204b can be formed so as to extend through the space by crossing them with each other.

Besides, the first and second controlling valve side supply oil paths 203b and 204b are disposed in a crossing relationship with each outer on the outer side of the projection range of the first and second oil pressure controlling valves 194 and 195 in the direction of the axial line of the crankshaft 37.

Therefore, although the crossing of the first and second oil pressure controlling valves 194 and 195 with each other increases the disposition space of the first and second controlling valve side supply oil paths 203b and 204b required in the crossing direction, increase of the engine width at a position at which the first and second oil pressure controlling valves 194 and 195 are disposed can be suppressed.

The first and second clutch oil pressure sensors 235 and 236 are disposed individually at an end portion of the first and second controlling valve side supply oil paths 203b and 204b on the opposite side to the first and second cover side supply oil paths 203a and 204a, and controlling oil pressures of the first and second hydraulic clutches 71 and 72 can be detected independently of each other.

At part of the second controlling valve side supply oil path 204b which is at least one of the first and second controlling valve side supply oil paths 203b and 204b, the semicircular arcuate portion 237 is formed such that it is disposed along the periphery of one of the plural bolts 202, ..., which fastens the support holder 200, which cooperates with the clutch cover 58 to sandwich the partition member 201 therebetween, to the clutch cover 58, such that it bypasses the one bolt 202. Therefore, the attaching strength at the fastening portion by the bolt 202 can be increased, and oil leakage from the proximity of the bolt 202 can be suppressed.

Further, the level gage insertion tube 238 extending upwardly from a lower portion of the clutch cover 58 is disposed on the outer side of the clutch cover 58 corresponding to the portion at which the first and second controlling valve side supply oil paths 203b and 204b cross with each other. Therefore, the level gage insertion tube 238 is disposed at a portion at which the engine width has a room in comparison with the portion at which the first and second oil pressure controlling valves 194 and 195 are disposed, and increase in size of the internal combustion engine E can be suppressed.

Further, the accommodating portion 239 for accommodating the solenoids 233 and 234 is provided in the support holder 200, and the cable extracting hole 244 for extracting the cables 242 and 243 connected to the solenoids 233 and 234 therethrough is provided at an upper portion of the accommodating portion 239 rearwardly of the first and second controlling valve side supply oil paths 203b and 204b. Therefore, the cables 242 and 243 can be extracted such that the first and second controlling valve side supply oil paths 203b and 204b side may not make an obstacle, and improvement in assembly property and maintenance property can be anticipated.

Further, the first and second clutch oil pressure sensors 235 and 236 are disposed closely and in parallel to each other on the clutch cover 58 while the axial lines thereof are directed in the forward and backward direction in a state in which the engine main body 32 is mounted on the motorcycle. Therefore, the first and second clutch oil pressure sensors 235 and 236 can be disposed efficiently and compactly with the directions thereof lined up with each other, and increase in size of the internal combustion engine E can be avoided.

Incidentally, on the clutch cover 58, the second oil filter 178 interposed between the second oil pump 116 and the first and second oil pressure controlling valves 194 and 195 and having the filter case 181 is disposed such that the axial line of the filter case 181 is disposed in a direction crossing with the axial lines of the first and second clutch oil pressure sensors 235 and 236, and the second oil filter 178 is disposed in a forwardly or backwardly displaced relationship from the first and second clutch oil pressure sensors 235 and 236 in a state in which the engine main body 32 is mounted on the motorcycle. Therefore, the second oil filter 178 and the first and second clutch oil pressure sensors 235 and 236 can be disposed in a forwardly or backwardly displaced relationship such that they do not overlap with each other in the leftward and rightward direction of the engine main body 32. Consequently, increase in size of the internal combustion engine E in the leftward and rightward direction can be suppressed.

Further, the first and second clutch oil pressure sensors 235 and 236 and the oil filter oil pressure sensor 191 for detecting the supply oil pressure to the second oil filter 178 are disposed in parallel to each other. Therefore, the oil filter oil pressure sensor 191 can be disposed efficiently and compactly in addition to the first and second clutch oil pressure sensors 235 and 236.

Further, since an outer end of the filter case 181 is disposed outwardly with respect to an outer end of the oil filter oil pressure sensor 191 along the axial direction of the filter case 181, when the motorcycle falls down, the oil filter oil pressure sensor 191 can be protected by the outer end of the filter case 181.

Besides, the projection 58a which projects outwardly sidewardly farther than the first clutch oil pressure sensor 235 positioned lowermost among the first clutch oil pressure sensor 235, second clutch oil pressure sensor 236 and oil filter oil pressure sensor 191 is provided in a projecting manner on the clutch cover 58 such that it is positioned in the proximity of the first clutch oil pressure sensor 235. Therefore, when the motorcycle falls down, the first clutch oil pressure sensor 235 positioned lowermost can be protected by the projection 58a.

Further, the level gage insertion tube 238 which is swollen sidewardly from the clutch cover 58 which configures part of the engine main body 32 is disposed rearwardly of the second oil filter 178, it is possible to prevent increase in size of the internal combustion engine E in the leftward and rightward direction by disposing the level gage insertion tube 238 making use of a dead space around the second oil filter 178.

The first and second clutch oil pressure sensors 235 and 236 and the oil filter oil pressure sensor 191 are disposed at a front side lower portion of a side face of the engine main body 32, and a front face lower portion of the engine main body 32 is formed in a curved state such that it is positioned downwardly toward the rear side. Further, the attaching boss 245 for assembling the first clutch oil pressure sensor 235 positioned lowermost from among the first clutch oil pressure sensor 235, second clutch oil pressure sensor 236 and oil filter oil pressure sensor 191 to the engine main body 32 is disposed at a position displaced rearwardly with respect to the attaching bosses 246 and 247 for attaching the hydraulic clutches 236 and 191 to the engine main body 32. Therefore, part of the first clutch oil pressure sensor 235 can be prevented from projecting forwardly from a lower portion of the engine main body 32.

Further, while the first clutch oil pressure sensor 235, second clutch oil pressure sensor 236 and oil filter oil pressure sensor 191 are disposed on the clutch cover 58 which is a side wall of the engine main body 32 on one end side in the axial line direction of the crankshaft 37, the first clutch oil pressure sensor 235, second clutch oil pressure sensor 236 and oil filter oil pressure sensor 191 are disposed forwardly with respect to the crankshaft 37 and downwardly with respect to the first and second hydraulic clutches 71 and 72. Therefore, the first clutch oil pressure sensor 235, second clutch oil pressure sensor 236 and oil filter oil pressure sensor 191 can be disposed bypassing the first and second hydraulic clutches 71 and 72 which exhibit the greatest width among the parts which configure the internal combustion engine E and the crankshaft 37 which has an influence on the widthwise dimension of the crankcase 38 of the engine main body 32. Consequently, increase in size of the internal combustion engine E can be suppressed.

Furthermore, the lubricating oil pressure sensor 248 for detecting the supply oil pressure of lubricating oil to be supplied to the lubrication object portions 175 at the plural places of the engine main body 32 is attached to the engine main body 32 forwardly with respect to the first and second clutch oil pressure sensors 235 and 236 and the oil filter oil pressure sensor 191. Therefore, the first clutch oil pressure sensor 235, second clutch oil pressure sensor 236 and oil filter oil pressure sensor 191 and the lubricating oil pressure sensor 248 can be disposed efficiently while avoiding interference between them.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine which includes:
    a plurality of hydraulic clutches,
    a plurality of oil pressure controlling valves for individually controlling an oil pressure for the hydraulic clutches, and
    a plurality of clutch oil pressure sensors for individually detecting a controlling oil pressure in a plurality of controlling oil supply paths interconnecting the oil pressure controlling valves and the hydraulic clutches,
    wherein the plurality of clutch oil pressure sensors are arranged adjacent to and parallel to each other, and
    each of the clutch oil pressure sensors has a longitudinal axis that is directed in a forward and backward direction of a saddle type vehicle when an engine main body is mounted on the vehicle,
    the internal combustion engine further comprising:
    an engine main body;
    a cover member covering each of the plurality of hydraulic clutches, and
    one of the controlling oil supply oil paths is formed in each the cover members, and
    wherein each of the plurality of oil pressure controlling valves corresponds to a different one of the plurality of hydraulic clutches, and
    each of the plurality of oil pressure controlling valves includes:
        a valve housing, and
        a valve body accommodated in the valve housing, and
    each the of the plurality of oil pressure controlling valves is adapted to control the oil pressure of a corresponding one the hydraulic clutches and the plurality of controlling oil supply oil paths,
    wherein the engine main body further comprises:
    a partition member is interposed between the cover member and the valve housing of each of the plurality of oil pressure controlling valves, and
    controlling valve side supply oil paths, each of which includes a cover side supply oil path extending parallel to a linear axis of the oil pressure controlling valves, and
    wherein the controlling valve side supply oil path and the housing of each of the oil pressure controlling valves is on an opposite face side of the corresponding partition member,
    the engine main body further comprising:
    a support holder adjacent to the housing of each of the oil pressure controlling valves,
    each of the support holders being adapted to attach the corresponding oil pressure controlling valve to the cover member with the corresponding partition member sandwiched between the cover member and the support holder,
    wherein a face of each of the support holders includes grooves which cooperate with opposite faces of the corresponding partition member to configure the controlling each of valve side supply oil paths,
    wherein each of the support holders includes a semicircular arcuate portion disposed along a periphery of corresponding bolts of the engine,
    wherein each of the bolts is adapted to fasten the corresponding support holder to the cover member, in such a manner that the semicircular arcuate portion bypasses the bolt.

2. The internal combustion engine according to claim 1, the internal combustion engine further comprising:
    an oil filter housed in a cylindrical filter case and being interposed between oil pressure generation means and the oil pressure controlling valves, such that an axial length of the cylindrical filter case is arranged in a direction substantially perpendicular to the longitudinal axes of the plurality of clutch oil pressure sensors, and
    when the engine main body is mounted on the vehicle, the oil filter is displaced forwardly or backwardly with respect to the plurality of clutch oil pressure sensors.

3. The internal combustion engine according to claim 1, the engine main body further comprising:
    a crankshaft having a longitudinal axis extending substantially perpendicular to the forward and the backward direction of a saddle type vehicle when the engine main body is mounted on the vehicle, and
    two main shafts which rotate in an interlocking relationship with the crankshaft,
    the plurality of clutch oil pressure sensors includes:
    a first clutch oil pressure sensor,
    a second clutch oil pressure sensor, and
    a third clutch oil pressure sensor,
    each of the first, the second, and the third clutch oil pressure sensors is provided on a side face of the engine main body on one longitudinal end side of the crankshaft in such a manner as to be disposed forwardly with respect to the crankshaft, and downwardly with respect to the hydraulic clutches,
    wherein the first, the second, and the third second clutch oil pressure sensors are adapted to change over connection/disconnection of power transmission between the crankshaft and the two main shafts.

4. The internal combustion engine according to claim 1, wherein each of the support holders includes a semicircular arcuate portion disposed along a periphery of corresponding bolts of the engine,
    wherein each of the bolts is adapted to fasten the corresponding support holder to the cover member, in such a manner that the semicircular arcuate portion bypasses the bolt.

5. The internal combustion engine according to claim 1, the engine main body further comprising:
    an accommodating portion provided in each of the support holders adapted to accommodate actuators for driving valve bodies of each of the oil pressure controlling valve, and
    a cable extracting hole for extracting cables connected to the actuators therethrough is provided at an upper portion of each of the accommodating portion rearwardly of the corresponding controlling valve side supply oil paths.

6. The internal combustion engine according to claim 2, wherein the plurality of clutch oil pressure sensors includes a first clutch oil pressure sensor and a second clutch oil pressure sensor which individually correspond to a pair of the hydraulic clutches, and
the internal combustion engine further comprising:
an oil filter oil pressure sensor adapted to detect a supply oil pressure to the oil filter.

7. The internal combustion engine according to claim 2, wherein the plurality of clutch oil pressure sensors includes a first clutch oil pressure sensor and a second clutch oil pressure sensor which individually correspond to a pair of the hydraulic clutches, and
the internal combustion engine further comprising:
an oil filter oil pressure sensor adapted to detect a supply oil pressure to the oil filter, and
an outer end of the cylindrical filter case is disposed outwardly with respect to an outer end of an oil filter oil pressure sensor along an axial direction of the cylindrical filter case.

8. The internal combustion engine according to claim 2, the internal combustion engine further comprising:
a level gage insertion tube provided on the engine main body and swollen sidewardly from the engine main body is disposed rearwardly with respect to the oil filter when the engine main body is mounted on the vehicle.

9. The internal combustion engine according to claim 6, wherein the first clutch oil pressure sensor is positioned lower than the second clutch oil pressure sensor,
the internal combustion engine further comprising:
a projection which projects outwardly and sidewardly with respect to the first clutch oil pressure sensor, and
the oil filter oil pressure sensor is provided in a projecting manner so as to be positioned in a proximity of the first clutch oil pressure sensor.

10. The internal combustion engine according to claim 6, wherein each of the first clutch oil pressure sensor, the second clutch oil pressure sensor, and the oil filter oil pressure sensor is disposed at a front side lower portion of a side face of the engine main body, and
the first clutch oil pressure sensor is positioned lower than each of the second clutch oil pressure sensor and the oil filter oil pressure sensor, and
the engine main body further comprising:
a front face lower portion is formed in a curved state such that it is positioned rearwardly toward a lower side, and
a first attaching boss adapted to attach the first clutch oil pressure sensor to the engine main body,
a second attaching boss adapted to attach the second clutch oil pressure sensor to the engine main body, and
a third attaching boss adapted to attach the oil filter oil pressure sensor to said the engine main body,
wherein the first attaching boss is displaced rearwardly with respect to each of the second attaching boss and the third attaching boss.

11. The internal combustion engine according to claim 6, further comprising:
engine main body further comprising:
a third oil pressure sensor adapted to detect a supply oil pressure of lubricating oil to be supplied to a plurality of lubrication object portions at a plurality of places of the engine main body,
wherein the third oil pressure sensor is attached to the engine main body forwardly with respect to each of the first and second clutch oil pressure sensors and the oil filter oil pressure sensor.

12. An internal combustion engine which includes:
a plurality of hydraulic clutches,
a plurality of oil pressure controlling valves for individually controlling an oil pressure for the hydraulic clutches, and
a plurality of clutch oil pressure sensors for individually detecting a controlling oil pressure in a plurality of controlling oil supply paths interconnecting the oil pressure controlling valves and the hydraulic clutches,
wherein the plurality of clutch oil pressure sensors are arranged adjacent to and parallel to each other, and
each of the clutch oil pressure sensors has a longitudinal axis that is directed in a forward and backward direction of a saddle type vehicle when an engine main body is mounted on the vehicle,
the internal combustion engine further comprising:
an engine main body;
a cover member covering each of the plurality of hydraulic clutches, and
one of the controlling oil supply oil paths is formed in each the cover members, and
wherein each of the plurality of oil pressure controlling valves corresponds to a different the plurality of hydraulic clutches, and
each of the plurality of oil pressure controlling valves includes:
a valve housing, and
a valve body accommodated in the valve housing, and
each the of the plurality of oil pressure controlling valves is adapted to control the oil pressure of a corresponding one the hydraulic clutches and the plurality of controlling oil supply oil paths,
wherein the engine main body further comprises:
a partition member is interposed between the cover member and the valve housing of each of the plurality of oil pressure controlling valves, and
controlling valve side supply oil paths, each of which includes a cover side supply oil path extending parallel to a linear axis of the oil pressure controlling valves, and
wherein the controlling valve side supply oil path and the housing of each of the oil pressure controlling valves is on an opposite face side of the corresponding partition member,
the engine main body further comprising:
a support holder adjacent to the housing of each of the oil pressure controlling valves,
each of the support holders being adapted to attach the corresponding oil pressure controlling valve to the cover member with the corresponding partition member sandwiched between cover member and the support holder,
wherein a face of each of the support holders includes grooves which cooperate with opposite faces of the corresponding partition member to configure the controlling each of valve side supply oil paths,
the engine main body further comprising:
a level gage insertion tube extending upwardly from a lower portion of the cover member, and being disposed on an outer side of the cover member in a corresponding relationship to a portion at which the controlling valve side supply oil paths cross with each other.

13. The internal combustion engine according to claim 12, the engine main body further comprising:

a support holder adjacent to the housing of each of the oil pressure controlling valves, each of the support holders being adapted to attach the corresponding oil pressure controlling valve to the cover member with the corresponding partition member sandwiched between the cover member and the support holder, wherein a face of each of the support holders includes grooves which cooperate with opposite faces of the corresponding partition member to configure the controlling each of valve side supply oil paths.

14. The internal combustion engine according to claim 12, the engine main body further comprising:

an actuators for driving valve bodies of each of the oil pressure controlling valves, each the actuators being disposed below a primary driving gear wheel disposed at a shaft end of a crankshaft as viewed in a side elevation in a direction along an axial line of the crankshaft, wherein the controlling valve side supply oil paths are disposed in a crossing relationship with each other between the actuators and the primary driving gear wheel as viewed in a side elevation view.

15. The internal combustion engine according to claim 12, wherein each of the plurality of oil pressure sensors includes a first clutch oil pressure sensor and a second clutch oil pressure sensor which are disposed individually at an end portion of corresponding ones the controlling valve side supply oil paths on an opposite side to the corresponding cover side supply oil paths.

16. The internal combustion engine according to claim 13, wherein the controlling valve side supply oil paths are disposed in a crossing relationship with each other on an outer side of a projection range of the oil pressure controlling valves in an axial direction of the crankshaft.

17. An internal combustion engine which includes:

first and second hydraulic clutches, first and second oil pressure controlling valves for individually controlling an oil pressure of the hydraulic clutches, and first and second clutch oil pressure sensors for individually detecting a controlling oil pressure in controlling oil supply paths interconnecting the oil pressure controlling valves and the hydraulic clutches, wherein the first and second clutch oil pressure sensors are arranged adjacent to and parallel to each other, and each of the clutch oil pressure sensors has a longitudinal axis that is directed in a forward and backward direction of a saddle type vehicle when an engine main body is mounted on the vehicle, the internal combustion engine further comprising:

an engine main body;

a cover member covering each of the plurality of hydraulic clutches, and one of the controlling oil supply oil paths is formed in each the cover members, and wherein each of the plurality of oil pressure controlling valves corresponds to a different the plurality of hydraulic clutches, and each of the plurality of oil pressure controlling valves includes:

a valve housing, and a valve body accommodated in the valve housing, and each the of the plurality of oil pressure controlling valves is adapted to control the oil pressure of a corresponding one the hydraulic clutches and the plurality of controlling oil supply oil paths, wherein the engine main body further comprises:

a partition member is interposed between the cover member and the valve housing of each of the plurality of oil pressure controlling valves, and controlling valve side supply oil paths, each of which includes a cover side supply oil path extending parallel to a linear axis of the oil pressure controlling valves, and wherein the controlling valve side supply oil path and the housing of each of the oil pressure controlling valves is on an opposite face side of the corresponding partition member, the engine main body further comprising:

a support holder adjacent to the housing of each of the oil pressure controlling valves, each of the support holders being adapted to attach the corresponding oil pressure controlling valve to the cover member with the corresponding partition member sandwiched between cover member and the support holder, wherein a face of each of the support holders includes grooves which cooperate with opposite faces of the corresponding partition member to configure the controlling each of valve side supply oil paths the engine main body further comprising:

an accommodating portion provided in each of the support holders adapted to accommodate actuators for driving valve bodies of each of the oil pressure controlling valves, and a cable extracting hole for extracting cables connected to the actuators therethrough is provided at an upper portion of each of the accommodating portion rearwardly of the corresponding controlling valve side supply oil paths.

18. The internal combustion engine according to claim 17, further comprising:

the engine main body further comprising:

a crankshaft having a longitudinal axis extending substantially perpendicular to the forward and the backward direction of a saddle type vehicle when the engine main body is mounted on the vehicle, and two main shafts which rotate in an interlocking relationship with the crankshaft, the plurality of clutch oil pressure sensors includes:

a first clutch oil pressure sensor, a second clutch oil pressure sensor, and a third clutch oil pressure sensor, each of the first, the second, and the third clutch oil pressure sensors is provided on a side face of the engine main body on one longitudinal end side of the crankshaft in such a manner as to be disposed forwardly with respect to the crankshaft, and downwardly with respect to the hydraulic clutches, wherein the first, the second, and the third second clutch oil pressure sensors are adapted to change over connection/disconnection of power transmission between the crankshaft and the two main shafts.

19. The internal combustion engine according to claim 18, the engine main body further comprising:

a third oil pressure sensor adapted to detect a supply oil pressure of lubricating oil to be supplied to a plurality of lubrication object portions at a plurality of places of the engine main body, wherein the third oil pressure sensor is attached to the engine main body forwardly with respect to each of the first and second clutch oil pressure sensors and the oil filter oil pressure sensor.

* * * * *